US010367873B2

(12) United States Patent
Kärkkäinen et al.

(10) Patent No.: US 10,367,873 B2
(45) Date of Patent: Jul. 30, 2019

(54) METHOD OF COMMUNICATING DATA PACKETS WITHIN DATA COMMUNICATION SYSTEMS

(71) Applicant: GURULOGIC MICROSYSTEMS OY, Turku (FI)

(72) Inventors: Tuomas Kärkkäinen, Turku (FI); Ossi Kalevo, Akaa (FI)

(73) Assignee: GURULOGIC MICROSYSTEMS OY, Turku (FI)

( * ) Notice: Subject to any disclaimer, the term of this patent is extended or adjusted under 35 U.S.C. 154(b) by 0 days.

(21) Appl. No.: 15/701,844

(22) Filed: Sep. 12, 2017

(65) Prior Publication Data
US 2018/0007108 A1    Jan. 4, 2018

Related U.S. Application Data

(63) Continuation of application No. PCT/EP2016/025024, filed on Mar. 14, 2016.

(30) Foreign Application Priority Data

Mar. 13, 2015 (GB) .................................. 1504336.7

(51) Int. Cl.
*H04J 3/24* (2006.01)
*H04L 29/06* (2006.01)
*H04L 12/861* (2013.01)

(52) U.S. Cl.
CPC ........ *H04L 65/602* (2013.01); *H04L 49/9057* (2013.01); *H04L 65/607* (2013.01);
(Continued)

(58) Field of Classification Search
CPC ..... H04L 47/36; H04L 47/365; H04L 65/602; H04L 69/22; H04L 49/90; H04L 49/9057; H04L 65/607; H04W 28/06; H04W 28/14
(Continued)

(56) References Cited

U.S. PATENT DOCUMENTS 6,490,705 B1 * 12/2002 Boyce .................... H04N 19/66
714/776
6,721,334 B1 * 4/2004 Ketcham ................. H04L 49/90
370/473
(Continued)

FOREIGN PATENT DOCUMENTS

EP    1725036 A1    11/2006
EP    2395727 A1    12/2011
(Continued)

OTHER PUBLICATIONS

Korean Office Action issued by the Korean Intellectual Property Office in relation to Korean Patent Application No. 10-2017-7029353 dated Nov. 13, 2017 (4 pages) along with English language translation (5 pages).
(Continued)

*Primary Examiner* — Harun Chowdhury
(74) *Attorney, Agent, or Firm* — Robert P. Michal, Esq.; Carter, DeLuca & Farrell LLP

(57) ABSTRACT

A data communication system is provided. The data communication system includes at least one transmitter that is operable to communicate data packets via a data communication network and/or a data carrier to at least one receiver. The at least one transmitter is operable to include within at least one of the data packets a plurality of mutually different types of data having mutually different priorities. Optionally, the data communication system is operable to communicate to the at least one receiver information that is indicative of the one or more priorities of the plurality of mutually different types of data. Optionally, the data communication system is operable to communicate the information that is indicative of the mutually different priorities of the plurality of mutually different types of data within the at least one of the data packets.

37 Claims, 12 Drawing Sheets

(52) U.S. Cl.
CPC ......... *H04L 69/22* (2013.01); *G09G 2340/02* (2013.01); *H04L 65/60* (2013.01); *H04L 69/166* (2013.01)

(58) Field of Classification Search
USPC ................ 370/252, 329, 338, 474, 349, 473
See application file for complete search history.

(56) References Cited

U.S. PATENT DOCUMENTS

| | | | |
|---|---|---|---|
| 7,000,120 | B1 | 2/2006 | Koodli et al. |
| 2002/0010712 | A1* | 1/2002 | Kimura ................ G11B 27/105 715/202 |
| 2003/0035413 | A1 | 2/2003 | Herle et al. |
| 2004/0248596 | A1* | 12/2004 | Panchal ................ H04W 4/06 455/466 |
| 2007/0104224 | A1 | 5/2007 | Conner et al. |
| 2007/0297375 | A1* | 12/2007 | Bonta .................. H04W 28/06 370/338 |
| 2008/0192726 | A1* | 8/2008 | Mahesh ............... H04L 65/607 370/349 |
| 2010/0040084 | A1 | 2/2010 | Seyedi-Esfahani et al. |
| 2010/0172296 | A1 | 7/2010 | Singh et al. |
| 2012/0063449 | A1 | 3/2012 | Frederic et al. |
| 2014/0369210 | A1* | 12/2014 | Doyle .................. H04L 47/365 370/252 |
| 2016/0037576 | A1* | 2/2016 | Jeong .................. H04W 76/16 370/329 |

FOREIGN PATENT DOCUMENTS

| | | |
|---|---|---|
| GB | 2399712 A | 9/2004 |
| KR | 10-2011-0104550 A | 9/2011 |
| KR | 10-2012-0027526 A | 3/2012 |
| KR | 20120027526 A | 3/2012 |
| WO | WO-2010/0144864 A1 | 12/2010 |

OTHER PUBLICATIONS

Combined Search and Examination Report under Sections 17 and 18(3) issued by the United Kingdom Intellectual Property Office in relation to United Kingdom Application No. GB 1504336.7 dated Sep. 14, 2015 (7 pages).
Examination Report under Section 18(3) issued by the United Kingdom Intellectual Property Office in relation to United Kingdom Application No. GB 1504336.7 dated Dec. 23, 2016 (3 pages).
International Search Report issued by the European Patent Office acting as the International Searching Authority in relation to International Application No. PCT/EP2016/025024 dated Jun. 21, 2016 (4 pages).
Written Opinion of the International Searching Authority issued by the European Patent Office acting as the International Searching Authority in relation to International Application No. PCT/EP2016/025024 dated Jun. 21, 2016 (5 pages).
Notification of Grant issued by the United Kingdom Intellectual Property Office in relation to United Kingdom Application No. 1504336.7 dated Feb. 14, 2017 (2 pages).
Korean Office Action issued by the Korean Intellectual Property Office in relation to Korean Patent Application No. 10-2017-7029353 dated May 1, 2018 (6 pages) along with English language translation (6 pages).
Notice of Final Rejection issued by the Korean Intellectual Property Office in relation to Korean Patent Application No. 10-2017-7029353 dated Feb. 7, 2018 (3 pages) along with an English translation (3 pages).
Notice of Allowance of Patent issued by the Korean Intellectual Property Office in relation to Korean Patent Application No. 10-2017-7029353 dated Sep. 13, 2018 (3 pages) along with an English translation (1 page).

* cited by examiner

METHOD OF COMMUNICATING DATA PACKETS WITHIN DATA COMMUNICATION SYSTEMS

CROSS REFERENCE TO RELATED APPLICATIONS

The present application is a Continuation Application of International Application No. PCT/EP2016/025024 filed Mar. 14, 2016 which claims priority to United Kingdom Patent Application No. GB 1504336.7 filed Mar. 13, 2015, the entire disclosure of each of these application is incorporated herein by reference in their entirety.

TECHNICAL FIELD

The present disclosure relates to methods of communicating data packets within data communication systems. Moreover, the present disclosure also relates to data communication systems employing the aforesaid methods of communicating data packets. Furthermore, the present disclosure also relates to devices that are operable to implement the aforesaid methods. Additionally, the present disclosure relates to computer program products comprising a non-transitory computer-readable storage medium having computer-readable instructions stored thereon, the computer-readable instructions being executable by a computerized device comprising processing hardware to execute the aforementioned methods.

BACKGROUND INFORMATION

FIG. 1 is a schematic illustration of a conventional data communication method; FIG. 1 represents prior art. Input data (D1) 10 is processed and encoded to generate corresponding encoded output data (E2) 20. For this purpose, one or more encoding transformations (F) 30 are applied to the input data (D1) 10.

The encoded output data (E2) 20 is often communicated via a data carrier and/or a data communication network to one or more decoders. These decoders are operable to apply one or more decoding transformations ($F^{-1}$) 80 to the encoded output data (E2) 20 to generate corresponding decoded data (D3) 90.

The input data (D1) 10 often includes various types of data, for example, such as audio data, video data, image data, text data, sensor data, and so forth. In operation, a situation often arises that certain of the various types of data have a higher priority over others. As an example, audio data is given a higher priority for delivery, in an event that the data communication network is unable to deliver video data due to insufficient data bandwidth. Moreover, there arise different priorities for temporal delivery of the different types of data. As an example, audio data needs to be delivered promptly, whereas text data may be less temporally critical.

Thus, it is commonly known that different types of data can have mutually different requirements as regards data transfer. In this regard, some conventional data communication systems have been designed in a manner that they take into account requirements of different types of data communicated therethrough, either in running processes of the data communication systems themselves, or included in their communication protocols, for example, in respect of their real-time operation.

A known prior art technique is the Real Time Messaging Protocol (RTMP) designed by Macromedia Inc., but currently owned by Adobe Systems Incorporated (see reference [1]). The RTMP comprises both a data transfer format and a communication system, wherein data transfer within the communication system is integrated with operation logics that process messages in a prioritized manner so that the messages are not treated equally. Such prioritizing makes it possible, for example, to process and transmit audio data before video data.

However, the RTMP protocol splits the messages into smaller fragments called "chunks", whose composition is decided by at least one server and at least one client by a mutual agreement. Such decisions are made depending both on a communication protocol used and on various different variables that the RTMP protocol describes (see reference [2]).

The RTMP protocol is usually used together with either the contemporary User Datagram Protocol (UDP) or the contemporary Transmission Control Protocol (TCP), wherein messages are usually split into data chunks whose size is in a range of 128 bytes to 256 bytes.

Furthermore, as data communication networks routinely transfer large quantities of different types of data in various system processes and external processes, it is evident that data transfer capacities of these data communication networks are usually not sufficient unless a given application, device or the data communication networks themselves attempt to control available transfer capacities of the data communication networks using Quality of Service (QoS) schemes (see reference [3]).

A problem encountered with known contemporary data communication networks is that several individual processes executing in an overall system associated with the known contemporary data communication networks often implement their own QoS arrangements mutually independently, programmatically, without taking into consideration needs of other processes being executed in the data communication networks.

Another problem encountered with the known contemporary data communication networks is that an operating system level QoS approach that has been used is potentially not optimized for all types of data being transferred through the data communication networks. As a result, further performance deterioration in the data communication networks can arise, since operating systems of different devices mutually differ. These operating systems often do not have sufficient functionality to take into consideration communication network related needs of other programs, devices and applications, but instead aim to control all data that is transmitted or received through the data communication networks.

Moreover, an operating system or a device may be executing various mutually different anti-virus software and firewall arrangements, whose principal mission is to allow only clean and known data to be transferred. Scanning of data performed by these anti-virus software and firewall arrangements potentially causes delays in data transfer, both during transmission and reception of data.

Moreover, as deployment of the Internet become increasingly geographically common throughout the World, the data communication networks increasingly suffer from a considerable lack of data transfer capacity, which makes them very slow in response times. In a transition phase of software development, it is not understood what really happens in the data communication networks when, for example, data is transmitted one-character-at-a-time or only a few bytes at a time. Such one-character-at-a-time data transfer causes a large amount of so-called almost empty data packets to be circulating in the data communication networks, which is highly inefficient.

To address the aforementioned data transfer problem for one-character-at-a-time, the Nagle's algorithm has been developed (see reference [4]). However, the Nagle's algorithm is not designed to prioritize between different types of data, neither is it a completely functioning model for implementing real-time communication. This is because the algorithm itself collects and stores data until a given data communication network's capacity for a data packet has been reached maximally.

Furthermore, it will be appreciated that data to be transferred is conventionally fragmented both in wired and in wireless data communication networks. A data packet is optionally fragmented regardless of an infrastructure or system settings of a given transmitter or a given receiver, because network nodes optionally have several transmitters that have different-sized capacities. Low-end routers and/or networks optionally split a large-sized data packet into smaller fragments that comply with capabilities of those routers and/or networks, because otherwise they would not be able to transfer the data packet forward in a controlled manner.

For example, wireless General Packet Radio Service (GPRS) networks of mobile phone operators using the Global System for Mobile communications (GSM) standard often conventionally split data packets into smaller fragments (see reference [5]).

When a transmitted data packet is fragmented into smaller packets, as occurs in known data communication systems, new problems are caused as data communication networks join at routers while transmitting the data packet to a given receiver.

Similar types of problems occur especially in wireless data communication networks, such as Wireless Local Area Networks (WLAN) (see reference [6]). Some of the most common problems encountered in the conventional WLAN are packet collisions and packet loss. Thus, more problems are caused when fragmented packets are processed.

SUMMARY

The present disclosure seeks to provide an improved data communication system.

Moreover, the present disclosure seeks to provide an improved method of communicating data.

A further aim of the present disclosure is to at least partially overcome at least some of the problems of the prior art, as discussed above.

In a first aspect, embodiments of the present disclosure provide a data communication system including at least one transmitter that is operable to communicate data packets via a data communication network and/or a data carrier to at least one receiver, wherein the at least one transmitter is operable to include within at least one of the data packets a plurality of mutually different types of data having mutually different priorities.

The invention is of advantage in that the data communication system is capable of communicating various types of data in a more efficient manner.

By "mutually different types of data" is meant data of mutually different content, structure, format, for example encoding format, temporal characteristics (for example a video sequence or an audio sample), multi-dimensional data (for example relating to 3-dimensional biological scanning images) and so forth.

By "mutually different priorities" is meant an order in which given data to be communicated is selected to be processed and thereafter communicated in a data communication system.

Optionally, the data communication system is operable to communicate to the at least one receiver information that is indicative of one or more priorities of the plurality of mutually different types of data.

The data communication network includes at least one of: an optical fibre-based data communication network, a wired data communication network, a wireless data communication network, a physical data carrier, a single-quantum data communication network within which bits are uniquely and exclusively defined by their corresponding quantum when communicated. Quantum data communication networks are often employed where an ultra-degree of data security and data confidentiality are required. The data carrier includes at least one of: solid state memory, optical memory, magnetic memory, ferroelectric memory, quantum memory.

More optionally, the data communication system is operable to communicate the information that is indicative of the one or more priorities of the plurality of mutually different types of data within the at least one of the data packets.

More optionally, the at least one transmitter is operable to include the information to be indicative of at least one of: life-times of the different types of data, permissible latencies of the different types of data, formats of the different types of data, time-to-live expectations of the different types of data, required response times for the different types of data.

Optionally, the data communication system is operable to generate the at least one of the data packets by employing a multistage process that includes:
(i) providing data to at least one data stream;
(ii) compressing the at least one data stream; and
(iii) assembling the at least one data stream to generate the data packets for communicating from the at least one transmitter to the at least one receiver.

Optionally, the data communication system and/or the data carrier is operable to communicate the information that is indicative of the one or more priorities of the plurality of mutually different types of data within the at least one of the data packets.

Optionally, the at least one transmitter is operable to construct the data packets as determined by configuration data received from the at least one receiver and/or the data communication network.

Optionally, the at least one transmitter is operable to assemble the data packets until their size approaches substantially a maximum segment size of the data communication network before sending the data packets to the at least one receiver.

More optionally, the data communication system is operable to adjust a size of the data packets to a maximum supported segment size of an entire communication route through the data communication network from the at least one transmitter to the at least one receiver.

More optionally, the data communication system is operable periodically to reprobe the maximum supported segment size of the entire communication route, and to adjust dynamically the size of the data packets pursuant to the reprobed maximum supported segment size of the entire communication route.

Optionally, the data communication network communicates the data packets without splitting the data packets into fragments.

Optionally, the data communication network is implemented, at least in part, as a peer-to-peer network.

More optionally, the one or more priorities are implemented in a priority order substantially as defined by:

| Prioritization code | Information type |
|---|---|
| Higher priority | Reserved 0 |
| | Control command |
| | Broadcast message |
| | Audio data |
| | Video data |
| | Reserved 5 |
| | Text data |
| | File data |
| Lower priority | Playback data |

Optionally, the at least one transmitter is operable to employ a maximum delay before sending a given data packet, and is operable to pad the given data packet to a maximum segment size if insufficient data has been provided for the mutually different types of data when the maximum delay is reached.

Optionally, the at least one transmitter is operable to generate the data packets, wherein at least a portion of the data packets is encrypted, and the at least one receiver is operable to decrypt the at least a portion of the data packets when the data packets are received at the at least one receiver.

In a second aspect, embodiments of the present disclosure provide a transmitter for use in a data communication system, the transmitter being operable to communicate data packets via a data communication network and/or a data carrier to at least one receiver, wherein the transmitter is operable to include within at least one of the data packets a plurality of mutually different types of data having mutually different priorities.

By "mutually different types of data" is meant data of mutually different content, structure, format, for example encoding format, temporal characteristics (for example a video sequence or an audio sample), multi-dimensional data (for example relating to 3-dimensional biological scanning images) and so forth.

By "mutually different priorities" is meant an order in which given data to be communicated is selected to be processed and thereafter communicated in a data communication system.

Optionally, the transmitter is operable to communicate to the at least one receiver information that is indicative of one or more priorities of the plurality of mutually different types of data.

Optionally, the transmitter is operable to include the information that is indicative of the one or more priorities of the plurality of mutually different types of data within the at least one of the data packets.

More optionally, the transmitter is operable to include the information to be indicative of at least one of: lifetimes of the different types of data, permissible latencies of the different types of data, formats of the different types of data, time-to-live expectations of the different types of data, required response times for the different types of data.

More optionally, the transmitter is operable to generate the at least one of the data packets by employing a multi-stage process that includes:
(i) Providing data to at least one data stream;
(ii) Compressing the at least one data stream; and
(iii) Assembling the at least one data stream to generate the data packets for communicating from the transmitter to at least one receiver.

More optionally, the transmitter is operable to construct the data packets as determined by configuration data received from the at least one receiver and/or the data communication network.

More optionally, the transmitter is operable to assemble the data packets until their size approaches substantially a maximum segment size of the data communication network before sending the data packets to the at least one receiver.

More optionally, the transmitter is operable to adjust a size of the data packets to a maximum supported segment size of an entire communication route through the data communication network from the transmitter to the at least one receiver.

More optionally, the transmitter is operable periodically to reprobe the maximum supported segment size of the entire communication route, and to adjust dynamically the size of the data packets pursuant to the reprobed maximum supported segment size of the entire communication route.

More optionally, the one or more priorities are implemented in a priority order substantially as defined by:

| Prioritization code | Information type |
|---|---|
| Higher priority | Reserved 0 |
| | Control command |
| | Broadcast message |
| | Audio data |
| | Video data |
| | Reserved 5 |
| | Text data |
| | File data |
| Lower priority | Playback data |

More optionally, the transmitter is operable to employ a maximum delay before sending a given data packet and is operable to pad the given data packet to a maximum segment size if insufficient data has been provided for the mutually different types of data when the maximum delay is reached.

More optionally, the transmitter is operable to generate the data packets, wherein at least a portion of the data packets is encrypted for subsequent decryption at the at least one receiver.

In a third aspect, embodiments of the present disclosure provide a receiver for use in a data communication system, wherein the receiver is operable to process at least one data packet received via a data communication network and/or a data carrier from at least one transmitter, wherein the at least one data packet includes a plurality of mutually different types of data having mutually different priorities, and to process the mutually different types of data to mutually separate the mutually different types of data.

By "mutually different types of data" is meant data of mutually different content, structure, format, for example encoding format, temporal characteristics (for example a video sequence or an audio sample), multi-dimensional data (for example relating to 3-dimensional biological scanning images) and so forth.

By "mutually different priorities" is meant an order in which given data to be processed is selected to be correspondingly processed in a data communication system.

Optionally, the mutually different types of data are separated out in the receiver to corresponding channels, for example, such as meta data, audio data, video data, parameter data.

Optionally, the receiver is operable to receive information that is indicative of the one or more priorities of the plurality of mutually different types of data, and to process the mutually different types of data according to the information that is indicative of the one or more priorities of the plurality of mutually different types of data.

Optionally, the receiver is operable to process the information that is indicative of the one or more priorities of the plurality of mutually different types of data, wherein the information is included within the at least one data packet.

More optionally, the receiver is operable to unpack the at least one data packet to extract data chunks of the mutually different types of data from the at least one data packet, and to construct data streams of the mutually different types of data from the data chunks as per an order in which the data chunks occur in the at least one data packet.

More optionally, the receiver is operable to decrypt at least a portion of the at least one data packet when the at least a portion of the at least one data packet is encrypted.

In a fourth aspect, embodiments of the present disclosure provide a method of communicating data, the method including communicating data packets via a data communication network and/or a data carrier from at least one transmitter to at least one receiver, wherein the method further includes including within at least one of the data packets a plurality of mutually different types of data having mutually different priorities.

By "mutually different types of data" is meant data of mutually different content, structure, format, for example encoding format, temporal characteristics (for example a video sequence or an audio sample), multi-dimensional data (for example relating to 3-dimensional biological scanning images) and so forth.

By "mutually different priorities" is meant an order in which given data to be communicated is selected to be processed and thereafter communicated in a data communication system.

Optionally, the method further includes communicating to the at least one receiver information that is indicative of the one or more priorities of the plurality of mutually different types of data.

Optionally, the method includes incorporating the information that is indicative of the one or more priorities of the plurality of mutually different types of data within the at least one data packet.

More optionally, the receiver is operable to unpack the at least one data packet to extract data chunks of the mutually different types of data from the at least one data packet, and to construct data streams of the mutually different types of data from the data chunks as per an order in which the data chunks occur in the at least one data packet.

More optionally, the method further includes including the information to be indicative of at least one of: life-times of the different types of data, permissible latencies of the different types of data, formats of the different types of data, time-to-live expectations of the different types of data, required response times for the different types of data.

More optionally, the receiver is operable to decrypt at least a portion of the at least one data packet when the at least a portion of the at least one data packet is encrypted.

More optionally, the method further includes generating the at least one of the data packets by employing a multi-stage process that includes:
(i) providing data to at least one data stream;
(ii) compressing the at least one data stream; and
(iii) assembling the at least one data stream to generate the data packets for communicating from the at least one transmitter to the at least one receiver.

More optionally, the method further includes constructing the data packets as determined by configuration data received from the at least one receiver and/or the data communication network.

More optionally, the method further includes assembling the data packets until their size approaches substantially a maximum segment size of the data communication network before sending the data packets to the at least one receiver.

More optionally, method further includes adjusting a size of the data packets to a maximum supported segment size of an entire communication route through the data communication network from the at least one transmitter to the at least one receiver.

More optionally, the method further includes periodically reprobing the maximum supported segment size of the entire communication route; and adjusting dynamically the size of the data packets pursuant to the reprobed maximum supported segment size of the entire communication route.

More optionally, the data communication network communicates the data packets without splitting the data packets into fragments.

More optionally, the data communication network is implemented, at least in part, as a peer-to-peer network.

More optionally, the method further comprises implementing the one or more priorities in a priority order substantially as defined by:

| Prioritization code | Information type |
| --- | --- |
| Higher priority | Reserved 0 |
| | Control command |
| | Broadcast message |
| | Audio data |
| | Video data |
| | Reserved 5 |
| | Text data |
| | File data |
| Lower priority | Playback data |

More optionally, the method further includes employing a maximum delay before sending a given data packet; and padding the given data packet to a maximum segment size if insufficient data has been provided for the mutually different types of data when the maximum delay is reached.

More optionally, the method further includes generating the data packets at the at least one transmitter, wherein at least a portion of the data packets is encrypted; and decrypting the at least a portion of the data packets at the at least one receiver when the data packets are received at the at least one receiver.

In a fifth aspect, embodiments of the present disclosure provide a method of operating a transmitter, the method including communicating data packets via a data communication network and/or a data carrier from at least one transmitter to at least one receiver, wherein the method further includes including within at least one of the data packets a plurality of mutually different types of data having mutually different priorities.

By "mutually different types of data" is meant data of mutually different content, structure, format, for example encoding format, temporal characteristics (for example a video sequence or an audio sample), multi-dimensional data (for example relating to 3-dimensional biological scanning images) and so forth.

By "mutually different priorities" is meant an order in which given data to be communicated is selected to be processed and thereafter communicated in a data communication system.

Optionally, the method further includes communicating to the at least one receiver information that is indicative of one or more priorities of the plurality of different types of data.

More optionally, the method further includes incorporating the information that is indicative of the one or more priorities of the plurality of mutually different types of data within the at least one data packet.

More optionally, the method further includes including the information to be indicative of at least one of: life-times of the different types of data, permissible latencies of the different types of data, formats of the different types of data, time-to-live expectations of the different types of data, required response times for the different types of data.

Optionally, the method further includes generating the at least one of the data packets by employing a multistage process that includes:
(i) providing data to at least one data stream;
(ii) compressing the at least one data stream; and
(iii) assembling the at least one data stream to generate the data packets for communicating from the at least one transmitter to the at least one receiver.

Optionally, the method further includes constructing the data packets as determined by configuration data received from the at least one receiver and/or the data communication network.

Optionally, the method further includes assembling the data packets until their size approaches substantially a maximum segment size of the data communication network before sending the data packets to the at least one receiver.

More optionally, the method further includes adjusting a size of the data packets to a maximum supported segment size of an entire communication route through the data communication network from the at least one transmitter to the at least one receiver.

More optionally, the method further includes periodically reprobing the maximum supported segment size of the entire communication route; and adjusting dynamically the size of the data packets pursuant to the reprobed maximum supported segment size of the entire communication route.

Optionally, the data communication network communicates the data packets without splitting the data packets into fragments.

Optionally, the data communication network is implemented, at least in part, as a peer-to-peer network.

More optionally, the method further includes implementing the one or more priorities in a priority order substantially as defined by:

| Prioritization code | Information type |
| --- | --- |
| Higher priority | Reserved 0 |
|  | Control command |
|  | Broadcast message |
|  | Audio data |
|  | Video data |
|  | Reserved 5 |
|  | Text data |
|  | File data |
| Lower priority | Playback data |

Optionally, the method further includes employing a maximum delay before sending a given data packet; and padding the given data packet to a maximum segment size if insufficient data has been provided for the mutually different types of data when the maximum delay is reached.

Optionally, the method further includes generating the data packets, wherein at least a portion of the data packets is encrypted; and decrypting the at least a portion of the data packets at the at least one receiver when the data packets are received at the at least one receiver.

In a sixth aspect, embodiments of the present disclosure provide a method of operating a receiver, wherein the method including:

processing at least one data packet received via a data communication network and/or a data carrier from at least one transmitter, wherein the at least one data packet includes a plurality of mutually different types of data having mutually different priorities; and processing the mutually different types of data to mutually separate the plurality of mutually different types of data.

By "mutually different types of data" is meant data of mutually different content, structure, format, for example encoding format, temporal characteristics (for example a video sequence or an audio sample), multi-dimensional data (for example relating to 3-dimensional biological scanning images) and so forth.

By "mutually different priorities" is meant an order in which given data to be processed is selected to be correspondingly processed in a data communication system.

Optionally, the method further includes receiving at the receiver information that is indicative of the one or more priorities of the plurality of mutually different types of data; and processing the mutually different types of data according to the information that is indicative of the one or more priorities of the plurality of mutually different types of data.

Optionally, in the method, the information that is indicative of the one or more priorities of the plurality of mutually different types of data is included within the at least one data packet.

Optionally, the method further comprises unpacking the at least one data packet to extract data chunks of the mutually different types of data from the at least one data packet; and constructing data streams of the mutually different types of data from the data chunks as per an order in which the data chunks occur in the at least one data packet.

Optionally, the method further comprises decrypting at least a portion of the at least one data packet when the at least a portion of the at least one data packet is encrypted.

In a seventh aspect, embodiments of the present disclosure provide a computer program product including a non-transitory computer-readable storage medium having computer-readable instructions stored thereon, the computer-readable instructions being executable by a computerized device including processing hardware wherein when the computer-readable instructions are executed by the computerized device, the computerized device performs any of the aforementioned methods.

In an eighth aspect, embodiments of the present disclosure provide a computer program product including a non-transitory computer-readable storage medium having computer-readable instructions stored thereon, the computer-readable instructions being executable by a computerized device comprising processing hardware wherein when the computer-readable instructions are executed by the computerized device, the computerized device performs the method of communicating data packets via a data communication network and/or a data carrier to at least one receiver, and including within at least one of the data packets a plurality of mutually different types of data having mutually different priorities.

In a ninth aspect, embodiments of the present disclosure provide a computer program product including a non-transitory computer-readable storage medium having computer-readable instructions stored thereon, the computer-readable instructions being executable by a computerized device comprising processing hardware wherein when the computer-readable instructions are executed by the computerized device, the computerized device performs the method of processing at least one data packet received via a data communication network and/or a data carrier from at least one transmitter, wherein the at least one data packet includes a plurality of mutually different types of data having mutually different priorities; and processing the mutually different types of data to mutually separate the plurality of mutually different types of data.

Embodiments of the present disclosure are capable of providing an at least partial solution to the aforementioned problem, and enable processing of prioritized data into data packets, so that time-critical data is duly delivered to a given receiver before the data is outdated or before a time-to-live period defined for the data ends.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and apparatus disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIG. 1 represents prior art;

Figure 1:
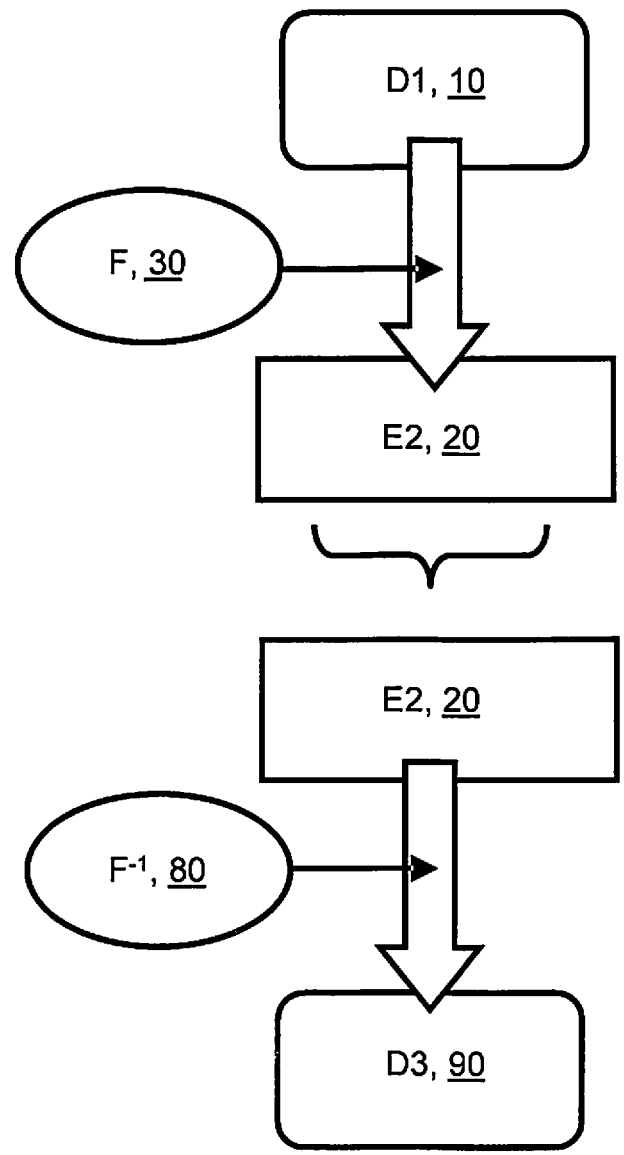
FIG. 1 is a schematic illustration of a conventional data communication method.

In the accompanying diagrams, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In a first aspect, embodiments of the present disclosure provide a data communication system comprising at least one transmitter that is operable to communicate data packets via a data communication network and/or a data carrier to at least one receiver, characterized in that the at least one transmitter is operable to include within at least one of the data packets a plurality of mutually different types of data having mutually different priorities.

By "mutually different types of data" is meant data of mutually different content, structure, format, for example encoding format, temporal characteristics (for example a video sequence or an audio sample), multi-dimensional data (for example relating to 3-dimensional biological scanning images) and so forth.

By "mutually different priorities" is meant an order in which given data to be communicated is selected to be processed and thereafter communicated in a data communication system.

Optionally, the data communication system is operable to provide information to the at least one receiver that is indicative of the mutually different priorities of the plurality of mutually different types of data.

It is to be noted herein that the term "transmitter" does not necessarily refer to a source device from where data originated, but can also refer to an intermediate network device (namely a "proxy") of a data communication network that processes the data received from the source device and delivers the processed data to the at least one receiver. In other words, the data communication system processes and delivers the data, either internally inside a given computing device or externally via the data communication network, namely a network device of the data communication network. Optionally, the information that is indicative of the mutually different priorities of the plurality of mutually different types of data is incorporated into the at least one of the data packets. However, it will be appreciated that the information, additionally or alternatively, is supplied separately to the at least one receiver, for example in one or more separate data packets dedicated to communicating the information, and/or pre-programmed into the at least one receiver.

According to an embodiment, the at least one transmitter is operable to include the information to be indicative of at least one of: life-times of the different types of data, permissible latencies of the different types of data, formats of the different types of data, time-to-live expectations of the different types of data, required response times for the different types of data.

Optionally, the data communication system is operable to generate the at least one of the data packets by employing a multistage process that includes:

(i) providing data to at least one data stream;
(ii) compressing the at least one data stream; and
(iii) assembling the at least one data stream to generate the data packets for communicating from the at least one transmitter to the at least one receiver.

According to an embodiment, the at least one transmitter is operable to construct the data packets as determined by configuration data received from the at least one receiver and/or the data communication network. In this regard, the at least one transmitter is operable to construct the data packets in a manner that the data packets are optimal for both the at least one receiver and the data communication network. Optionally, when there are a plurality of receivers, and the receivers are mutually different, the at least one transmitter is operable to transmit data using a plurality of mutually different constructions to customize transmitted data to suit the plurality of receivers. Alternatively, the data communication network is operable to identify a common form of construction of data that is suited to all the plurality of receivers; such identification involves, for example, interrogating the plurality of receivers for the plurality of receivers to respond by indicating their respective form for constructed data to be received thereat, for example in respect of priorities. For example, certain receivers possess considerable data processing capability to handle video information in real-time, whereas other receivers have more modest data processing capability to handle only audio in real-time.

In addition to a delay that is accumulated in the data communication network when transmitting the data packets from the at least one transmitter to the at least one receiver, a further delay is generated at the at least one transmitter and the at least one receiver when the at least one transmitter and the at least one receiver process the data packets. Therefore, in addition to a speed of the data communication network, processing capacities of the at least one transmitter and the at least one receiver are taken into account when constructing the data packets. It will be appreciated that there are optionally a plurality of transmitters. Moreover, it will be appreciated that there are optionally a plurality of receivers, for example in a multi-casting situation.

Optionally, the at least one transmitter is operable to split a given type of data to be written or transmitted into optimally-sized data chunks, for example, as will be described later in conjunction with an example. Optionally, when determining a size of a given data chunk, an associated header included in the given data chunk is also taken into consideration. Optionally, the at least one transmitter is operable to construct the at least one of the data packets from data chunks of the different types of data.

According to an embodiment, the at least one transmitter is operable to assemble the data packets until their size approaches substantially a maximum segment size of the data communication network before sending the data packets to the at least one receiver.

Optionally, in this regard, the at least one transmitter and/or the data communication system is operable to recognize and calculate a maximum supported segment size of an entire communication route through the data communication network from the at least one transmitter to the at least one receiver, namely a maximum segment size that is supported by an infrastructure of the data communication network through the entire communication route. The maximum supported segment size yields information about a maximum amount of data that a single data packet is able to transfer through the entire communication route without being fragmented into smaller packets. Such an approach avoids the data communication system adding latency by having to reform data packets to communicate data through certain portions of the data communication system, thereby increasing data communication rates in operation.

Depending on the data communication network that is utilized, different concepts and mathematical formulae are used to calculate the maximum supported segment size. As an example, when the Internet Protocol (IP) of the Internet network is used, a Maximum Segment Size (MSS) can be calculated for an entire communication route of a given connection if a Maximum Transmission Unit (MTU, see reference [7]) is known for the given connection. The IP protocol of the Internet network provides a standard technique for determining an MTU between two IP hosts, namely Path MTU Discovery (see reference [8]). Accordingly, optionally, the at least one transmitter is operable to use the Path MTU Discovery to find out the MTU between the at least one transmitter and the at least one receiver.

In an example where an MTU for a given connection between the at least one transmitter and the at least one receiver is determined to be 1500 bytes, the maximum supported segment size is calculated to be 1460 bytes for the IP protocol of the Internet network.

It will be appreciated that sub-optimal data packets, namely data packets that are either too small or too large, may be sent right after a given connection is set up between the at least one transmitter and the at least one receiver, before the data communication system has calculated the maximum supported segment size for an entire communication route of the given connection. Thus, the maximum supported segment size is optionally iteratively dynamically adjusted during communication of data from the at least one transmitter to the at least one receiver.

According to an embodiment, the at least one transmitter and/or the data communication system is operable to adjust a size of the data packets to the maximum supported segment size of the entire communication route. As a result, the data packets comply with the maximum supported segment size of the entire communication route. This potentially ensures that the data packets are not fragmented into smaller parts during their transmission through the data communication network. This potentially enables a more efficient data transfer in the data communication network, as compared to conventional data communication systems where data packets are fragmented during transmission.

Thus, according to an embodiment, the data communication network communicates the data packets without splitting the data packets into fragments.

Moreover, less time is expended in delivering a same amount of data as compared to the conventional data communication systems. This potentially enables a maximal data transmission rate to be achieved for the data communication network. This is particularly beneficial in situations where a data transfer capacity of the data communication system and its associated infrastructure is already being used by other processes, and the data communication system is employed, for example, for a full-duplex real-time data transfer between one or more terminal devices.

It will be appreciated that, regardless of the data communication network being used, a data transfer capacity of the data communication network may potentially change suddenly. As an example, in the Internet network, a communication path may change while a data packet is being routed through the communication path. As a result, the MTU between the at least one transmitter and the at least one receiver may also change.

Optionally, in this regard, the at least one transmitter is operable to determine the MTU again, namely "reprobe" the MTU between the at least one transmitter and the at least one receiver. Accordingly, the maximum supported segment size is recalculated so as to be in sync with the change in the data transfer capacity of the data communication network. In other words, in embodiments of the present disclosure, the maximum supported segment size is temporally dynamically varied in response to changing MTU characteristics of the data communication network, for example as aforementioned in an iterative manner.

According to an embodiment, the at least one transmitter and/or the data communication system is operable periodically to reprobe the maximum supported segment size of the entire communication route, and to adjust dynamically the size of the data packets pursuant to the reprobed maximum supported segment size of the entire communication route.

It will be appreciated that an empty data packet is not sent, unless a given transfer protocol or a given command protocol specifically requires empty data packets to be sent, for example, for keeping a connection open to prevent a time-out and forced disconnection.

According to an embodiment, the data communication network is implemented, at least in part, as a peer-to-peer ("P2P") network. In this embodiment, at least a portion of the entire communication route is implemented as a peer-to-peer communication path.

It will be appreciated that the data communication system is not restricted to a certain type of the data communication network, and does not require any particular transport protocol. As an example, the data communication system is useable with the contemporary Internet network, wherein various mutually different transfer protocols are utilized, and wherein very large amounts of mutually different types of data are transferred. However, the data communication system is not limited to the aforementioned Internet network, but can be used with other types of data communication networks. As an example, the data communication system is susceptible to being employed in telecommunications networks that do not utilize the HyperText Transfer Protocol (HTTP), Transmission Control Protocol/Internet Protocol (TCP/IP) and similar.

Moreover, in an example, the at least one transmitter and the at least one receiver can be implemented as user devices. Examples of such user devices include, but are not limited to, scientific apparatus, digital cameras, digital video cameras, mobile phones, smart telephones, Mobile Internet Devices (MID's), tablet computers, Ultra-Mobile Personal Computers (UMPC's), phablet computers, Personal Digital Assistants (PDA's), web pads, Personal Computers (PC's), handheld PC's, laptop computers, desktop computers, and large-sized touch screens with embedded PC's. Such scientific apparatus include, for example genetic sequencing apparatus, biometric measurement apparatus, X-ray imaging apparatus, ultrasonic imaging apparatus, but not limited thereto.

Furthermore, examples of the mutually different types of data include, but are not limited to, control commands, broadcast messages, audio data, video data, text data, file data and/or playback data. In an embodiment, the mutually different types of data are prioritized in a descending order as follows: control commands>broadcast messages>audio data>video data>text data>file data>playback data.

According to an embodiment, the mutually different priorities of the mutually different types of data are implemented in a priority order substantially as defined by:

| Prioritization code | Information type |
| --- | --- |
| Higher priority | Reserved 0 |
| | Control command |
| | Broadcast message |
| | Audio data |
| | Video data |
| | Reserved 5 |
| | Text data |
| | File data |
| Lower priority | Playback data |

In the above table, the information types 'Reserved 0' and 'Reserved 5' correspond to priorities that are reserved for certain types of data. As an example, the information type 'Reserved 0' may be used for emergency messages, wherein the emergency messages have a highest priority for transmission. However, other priority orders are feasible, for example text data placed at a higher priority than audio data, for data communication systems of rather lower bandwidth, for example as in sub-sea apparatus, diving equipment and such like, wherein divers are provided with head-up displays in their visors.

For illustration purposes only, there will next be described an example of how priorities are defined in a data communication system pursuant to embodiments of the present disclosure. In this example, the data communication system is implemented in a Starwindow® system; "Starwindow" is a registered trademark. The Starwindow® system is concerned with offering a video-based real-time telepresence experience, namely a type of video-conferencing experience, for two or more simultaneous users.

In the example herein, the data communication system is configured to use a common application layer protocol, for example, as used in contemporary Internet communication, namely the HTTP. This means that the data communication system and its associated infrastructure will not be incompatible with different operating systems, firewalls or anti-virus software when employing embodiments of the present disclosure. Moreover, as aforementioned, embodiments of the present disclosure are not limited to the Internet, and alternatively, or additionally, are operable to communicate via other types of communication network, for example proprietary dedicated high-security data networks. Such other types of communication network includes, for example, dedicated emergency services communication networks, military communication networks, direct satellite data communication networks and similar.

Moreover, the HTTP processes data transmission by using a POST request method, and processes data reception by using a GET request method. Optionally, the aforementioned Starwindow® system uses these methods, wherein a "content transfer encoding" section of given content is implemented in optimally-sized chunks using a form of chunked transfer-coding, for example, as will be described later in conjunction with a next example. In this regard, a data connection is set up, for example, by utilizing the HTTP as described in reference [9], and a data communication system and associated method as described in reference [10].

Moreover, in order to be able to implement the data communication system in the Starwindow® system, mutually different types of data are prioritized and assigned prioritization codes. Various algorithms are optionally used to rank priorities of the different types of data. The priorities are ranked in a bottom-up or a top-down manner, or in any other suitable manner that clearly indicates a priority of a given type of data as compared with other types of data.

Optionally, the priorities of the different types of data are ranked based on at least one of: life-times of the different types of data, permissible latencies of the different types of data, formats of the different types of data, time-to-live expectations of the different types of data, required response times for the different types of data, and/or importance of content of the different types of data.

As regards time-to-live expectations of the different types of data, the outdating of data needs to be taken into consideration. In a practical implementation, for example in a case where a transmission pipeline operates more slowly than data can be produced, an accumulation of time-critical data that has been produced can efficiently be prevented in the following ways:

(a1) A time-critical section of a data stream is not assembled to a data pack to be optimized by using an Add function if the time-critical section of the data stream has been outdated or becomes outdated because of a delay in delivery. For example, audio data can be defined to be outdated in a period in a range of 10 milliseconds to 30 milliseconds;

(a2) A time-critical section of a data stream is not added to a memory to wait for the assembly if an accumulated data size in bytes or as parts of a stream of queuing data exceeds an outdating limit set for the time-critical section; and (b) A time-critical section of a data stream is added to a transmission pipeline by using the Add function; but if there are outdated sections of the data stream in the pipeline, then they are removed from the pipeline, starting with the oldest, progressing towards the youngest.

When the data communication system is operated as described above, then there is no need to set a time stamp for the sections of the data stream; if time stamps are used, then the inspection of the time stamps potentially hampers the other processes of a computer processing unit (CPU) of the data communication system. When the functionality is implemented as described above in items (a) and (b), the processing of outdated data indeed is advantageously executed without time stamps, thereby decreasing extraneous processor loads.

In an example where control commands enable a real-time functionality of a software program of the data communication system, the control commands are considered more important than audio data and, therefore, are given a relatively higher priority. In another example, audio data for a teleconference is given a higher priority over video data, as a time-to-live of the audio data is only a few tenths of a second. A high prioritization of the audio data is desirable to reduce delays that could otherwise render the audio unintelligible, for example, when undertaken as an oral dialogue. In yet another example, in a real-time control system, real-time sensor data is given a higher priority over archive data. In a yet another example, test data that is of more interest to a given receiver is given a higher priority over extraneous advertisement content.

Optionally, when assigning the prioritization codes, a lowest prioritization code is assigned to a type of data that has a highest priority. In this regard, the prioritization codes can be implemented, for example, as defined in an example table below.

| Prioritization code | Information type |
| --- | --- |
| 0x00 | Reserved 0 |
| 0x01 | Control command |
| 0x02 | Broadcast message |

-continued

| Prioritization code | Information type |
| --- | --- |
| 0x04 | Audio data |
| 0x08 | Video data |
| 0x10 | Reserved 5 |
| 0x20 | Text data |
| 0x40 | File data |
| 0x80 | Playback data |

In the example table above, control commands are more important than broadcast messages, which are more important than audio data, which is more important than video data. This implies that even when there would be video data available to be transmitted, control commands, broadcast messages and audio data will be transmitted before the video data.

As an example, the aforementioned Starwindow® system is configured in a manner that, under normal circumstances, a data packet to be transmitted includes control commands, audio data and video data. Optionally, in possibly changing circumstances, a data packet might include only control commands and audio data, thereby leaving no room for video data until a next data packet.

In this manner, types of data that are more important from a perspective of a given receiver are prioritized over other types of data.

Furthermore, at least one transmitter of the data communication system is operable to take into account priorities of different types of data that are available to be written or transmitted when constructing a data packet from data chunks of the different types of data. Correspondingly, when at least one receiver receives the data packet, the at least one receiver is operable to process the received data packet to unpack the different types of data in a prioritized manner. The at least one receiver is then operable to process the data chunks of the different types of data, and construct data streams of the different types of data from the data chunks as per an order in which the data chunks occur in the data packet. The at least one receiver is then operable to process the data streams further after the data streams have been constructed from the data chunks; for example, in the Starwindow® system, audio data is decompressed and played, while video data is decompressed and displayed.

Moreover, optionally, a given type of data is delivered to a given receiver in a form of a plurality of data chunks that are included in a single data packet. Alternatively, optionally, the given type of data is delivered to the given receiver in a form of a single data chunk that is included in a single data packet.

Moreover, optionally, a given data packet does not include any separate piece of information for expressing priorities of different types of data included within the given data packet. Optionally, prioritization codes of the different types of data can be delivered inside their respective data chunks or inside headers of the data chunks. Optionally, information for expressing priorities of different types of data included within the given data packet are communicated via a mutually different data communication channel to that employed for communicating the data packets including a plurality of different types of data.

For illustration purposes only, there will now be considered an example wherein a data communication system is implemented pursuant to embodiments of the present disclosure. One such example has been illustrated in conjunction with FIGS. 5A-C. At least one transmitter of the data communication system is provided with mutually different types of data to be written or transmitted to at least one receiver of the data communication system. In the example herein, a situation is considered, wherein the mutually different types of data include audio data, video data, text data and file data, and a descending order of priorities for the different types of data is: audio data, video data, text data, file data.

The at least one transmitter splits the mutually different types of data into optimally-sized chunks, namely splits the audio data into optimally-sized audio chunks, the video data into optimally-sized video chunks, the text data into optimally-sized text chunks, and the file data into optimally-sized file chunks. For this purpose, the at least one transmitter determines sizes of chunks for each type of data, while taking into account the priorities of the different types of data and relative amounts of data of the different types of data. In other words, the sizes of the data chunks may vary, if required. Such varying in size of data chunks increases flexibility, even though delivery of information about the sizes of the data chunks slightly increases an overhead for data transmission. By using optimally-sized data chunks, the generation of data packets can be controlled.

Beneficially, the chunk sizes are different for the different types of data. As an example, in a video conference, audio data is more time-critical as compared to video data. Moreover, a considerably less amount of the audio data is generated as compared to the video data, for example, as regards the amount of data in bytes. Therefore, it is beneficial to split the audio data into smaller chunks as compared to the video data.

Moreover, the chunk sizes need not be same for a same given type of data. As an example, all audio chunks need not be of a same size. Likewise, all video chunks need not be of a same size, and so on. When the size of chunks varies, information indicative of their sizes is delivered between the at least one transmitter and the at least one receiver. Otherwise, the size of chunks is predefined and is not required to be delivered.

When the data communication system employs the HTTP, the chunks not only include data to be written or transmitted, but also include associated header information. For a given chunk, its associated header information may, for example, include the chunk size or a length of the given chunk, and bytes that indicate that the given chunk has ended.

Moreover, optionally, a given chunk includes information about a given type of data that is included in the given chunk, thereby enabling a given receiver to handle the given type of data properly. Alternatively, optionally, the information about the given type of data can be delivered to the given receiver using other methods, for example, within a packet header, namely a header of a data packet within which the given chunk is included.

Furthermore, the at least one transmitter assembles at least one data packet from the chunks of the different types of data, until a size of the at least one data packet approaches substantially a maximum supported segment size of an entire communication route through a data communication network from the at least one transmitter to the at least one receiver. In other words, the at least one transmitter includes within the at least one data packet as many chunks as possible, until the size of the at least one data packet reaches the maximum supported segment size. Once the size of the at least one data packet reaches the maximum supported segment size, no further chunk can be added regardless of its priority.

Moreover, when the at least one data packet is constructed, chunks having a highest priority amongst available chunks are added first, and are followed by chunks having a lower priority going towards a lowest priority. As a result, the at least one data packet is constructed in a manner that chunks having different priorities are included within the at least one data packet.

A situation potentially arises, wherein the at least one data packet includes chunks of data of only one priority or includes a single chunk that alone is substantially as large as the maximum supported segment size. In this regard, the at least one transmitter splits the different types of data into optimally-sized chunks in a manner that chunks having a lower priority can also be included within the at least one data packet.

Moreover, there might arise a situation wherein one or more chunks that are already inserted into a given data packet, during construction, have a lower priority than a new chunk that is available to be written or transmitted. In such a case, the new chunk is optionally inserted before the already inserted chunks, as the new chunk has a higher priority over the already inserted chunks. Beneficially, a packet header may be employed, wherein lengths of data of different priorities are expressed with only a few bits. Thus, the packet header does not need to state prioritization codes and the lengths of individual chunks that occur at various positions in the data packet.

In this manner, the at least one transmitter assembles data packets from the chunks of the different types of data in a prioritizing manner, wherein at least one of the data packets includes different types of data that have different required response times and different time-to-live expectations. This enables the data communication system to use a maximal data transfer capacity of the data communication network. This potentially enables the data communication system to be implemented, for example, for a video conference or a video streaming service simultaneously with other communication services.

This is particularly beneficial for software applications that produce various mutually different types of data that require different response times when being transmitted from a given transmitter to a given receiver. The data communication system is beneficially employed to deliver data packets from the given transmitter to the given receiver in a manner that an operation of such software applications is not hampered or blocked. Examples of such software applications include, but are not limited to, Apple TV, Skype™, TeamViewer, and Starwindow®; "Apple TV", "Skype™", "TeamViewer", "Starwindow®" include registered trademarks.

Moreover, optionally, the at least one transmitter fragments data packets that are too large, when the at least one transmitter operates as a node between two different communication protocols, for example, such as an X.25 network and a TCP/IP network. As an example, the at least one transmitter can be implemented as a bridge between a closed authority network and the public Internet during emergencies, for example, when real-time audio-visual information is optionally transmitted directly from a private citizen to an emergency center or to a moving emergency vehicle. As another example, the at least one transmitter can be implemented in a situation where a bank account validation and/or transactions from payment terminal devices of a large department store chain are transmitted in real-time from department stores to credit card companies or banks that operate inside an external, closed network.

Furthermore, according to an embodiment, the at least one transmitter is operable to generate the data packets, wherein at least a portion of the data packets is encrypted, and the at least one receiver is operable to decrypt the at least a portion of the data packets when the data packets are received at the at least one receiver.

Optionally, in this regard, the size of the data packets having encrypted content is predefined and fixed. This makes it as difficult as possible to break an encryption employed by using a brute force technique. As an example, in a brute force technique, an attacker implements a data packet, wherein content of the data packet is as small-sized and probable as possible. The attacker then predicts the content of the data packet, and creates an encryption key that produces corresponding encrypted content that is same as an original encrypted content of the data packet, thereby breaking the encryption.

When data packets of a predefined, fixed size are constructed, predicting the content of the data packets becomes as difficult as possible. Moreover, an entropy of the data is made as high as possible, thereby making it as difficult as possible to break the encryption.

If a sufficient amount of a particular type of data is not available for constructing a given data packet, the given data packet is optionally padded with additional data until the predefined, fixed size of the given data packet is reached. Padding the given data packet in such a manner is beneficial from a viewpoint of encryption.

Moreover, according to an embodiment, the at least one transmitter is operable to employ a maximum delay before sending a given data packet, and is operable to pad the given data packet to a maximum segment size if insufficient data has been provided for the mutually different types of data when the maximum delay is reached. In other words, when constructing the given data packet, the at least one transmitter does not wait for incoming data of any particular type beyond the maximum delay. This potentially prevents any extraneous processor load on the at least one transmitter, which occurs in conventional data communication systems where data is collected and assembled aggressively before transmission. This potentially allows other processes to use computing resources of the at least one transmitter when no data is available to be written or transmitted.

It is evident that during periods of time when the other processes are being executed, new data is piled up, namely accumulated, to be written or transmitted, for example, in real-time communication, regardless of whether or not a thread implementing the assembling has been commanded to return to its assembling task as soon as possible. Typically, operating systems have numerous processes running in their own threads and queuing for processing time, wherein each thread is provided the processing time to fulfill its task. Therefore, it is advantageous to implement the assembling of data in its own thread, and to let an operating system of the at least one transmitter to prioritize the tasks, while considering the overall computing resources of the at least one transmitter.

Moreover, as incomplete data packets, namely data packets having an amount of data smaller than the maximum segment size, are not sent, extraneous load on the data communication network is potentially prevented.

When data is available for transmission, no waiting periods occur, and the available data is sent immediately after having been inserted into a given data packet. If all of the available data does not fit in the given data packet, a portion of the available data that fits is inserted into the given data packet, while a remaining portion of the available data is inserted into a next data packet.

Optionally, a maximum delay to be employed for a given data packet is varied depending on a type of data that is included within the given data packet. As an example, if the type of data already included within the given data packet is highly time-critical, a shorter maximum delay is employed, and vice versa.

If a too short maximum delay is employed, a large number of data packets will be padded be default. This would potentially hamper data of other processes from being communicated. On the other hand, if a too long maximum delay is employed, delivery of the data packets will be delayed by default. Therefore, the maximum delay to be employed is selected optimally, so as to prevent frequent padding of the data packets, while also preventing long waiting periods for a buffer to fill before a data packet can be filled.

Employing the maximum delay before sending a given data packet is particularly beneficial for fast data communication networks. In slow data communication networks, there is typically more data to be sent than data that can be transmitted even with completely full data packets.

Furthermore, optionally, the data communication system addresses problems associated with data delivery and synchronization in situations where a given receiving connection and a given transmitting connection are run in mutually different threads. As a result, a mode of operation of the data communication system is inherently thread-safe.

The data communication system is optionally used in relay and proxy server arrangements, wherein data is optionally retransmitted from a given receiver to a given transmitter, and wherein a given receiving connection and a given transmitting connection are run in their own connection threads. As regards data delivery, these connection threads are optionally locked for a duration in which the data is written and/or read. Alternatively, optionally, the connection threads are not locked; instead, a thread-safe list is used and locked during writing and/or reading. This potentially enables a considerably faster and simpler thread-safe implementation pursuant to embodiments of the present disclosure.

The aforementioned prioritization and optimized packet construction process is beneficially run in parallel, utilizing multiple processor cores at a same given time, wherein multiple threads of execution make use of thread-safe inter-thread communication, thereby avoiding time-consuming lock situations, thus speeding up the construction of data packets. However, the method pursuant to embodiments of the present disclosure does not require that multiple processor cores be available for performing data processing.

Furthermore, optionally, the data communication system can be integrated, or at least synchronized, with a given codec. For illustration purposes only, there will now be considered an example wherein a given encoder of the given codec is integrated with the at least one transmitter, a given decoder of the given coded is integrated with the at least one receiver, and two frame buffers have been employed at the at least one transmitter. This integration or synchronization of the data communication system and the given codec is beneficially, optionally, run in parallel, in multiple processor cores, as explained above. However, such integration or synchronization is employable also in data communication systems that do not have multiple processor cores available.

In the example herein, a situation is considered wherein the given encoder encodes a first video frame to generate corresponding encoded video frame. The given encoder then inserts the encoded video frame as a first video chunk in a data packet having one or more audio chunks when there is a sufficient space available in the data packet for the first video chunk. Likewise, the encoder encodes a second video frame, and inserts corresponding encoded video frame as a second video chunk into a next data packet.

If the given decoder delivers an acknowledgement of proper receipt and processing of the first video frame before or during the encoding and delivery of the second video frame, the given encoder is able to continue with the encoding and delivery of a third video frame directly after finishing the delivery of the second video frame. If the given encoder does not receive any acknowledgement during the encoding and delivery of the second video frame, the given encoder waits for the acknowledgement of the first video frame to arrive before beginning to encode and deliver the third video frame.

In general, the given encoder encodes and delivers an $N^{th}$ video frame, wherein 'N' is a number larger than a number of frame buffers employed at the at least one transmitter, only after acknowledgements of previously-delivered video frames have been received from the given decoder.

In a second aspect, embodiments of the present disclosure provide a transmitter for use in a data communication system, the transmitter being operable to communicate data packets via a data communication network and/or a data carrier to at least one receiver, characterized in that the transmitter is operable to include within at least one of the data packets a plurality of mutually different types of data having mutually different priorities.

By "mutually different types of data" is meant data of mutually different content, structure, format, for example encoding format, temporal characteristics (for example a video sequence or an audio sample), multi-dimensional data (for example relating to 3-dimensional biological scanning images) and so forth.

By "mutually different priorities" is meant an order in which given data to be communicated is selected to be processed and thereafter communicated in a data communication system.

Optionally, the transmitter is operable to communicate to the at least one receiver information that is indicative of the mutually different priorities of the plurality of mutually different types of data.

Optionally, the transmitter is operable to include the information that is indicative of the mutually different priorities of the plurality of mutually different types of data within the at least one of the data packets.

According to an embodiment, the transmitter is operable to include the information to be indicative of at least one of: life-times of the different types of data, permissible latencies of the different types of data, formats of the different types of data, time-to-live expectations of the different types of data, required response times for the different types of data.

Optionally, the transmitter is operable to generate the at least one of the data packets by employing a multistage process that includes:
(i) providing data to at least one data stream;
(ii) compressing the at least one data stream; and
(iii) assembling the at least one data stream to generate the data packets for communicating from the transmitter to the at least one receiver.

According to an embodiment, the transmitter is operable to construct the data packets as determined by configuration data received from the at least one receiver and/or the data communication network.

According to an embodiment, the transmitter is operable to assemble the data packets until their size approaches substantially a maximum segment size of the data communication network before sending the data packets to the at least one receiver.

According to an embodiment, the transmitter is operable to adjust a size of the data packets to a maximum supported segment size of an entire communication route through the data communication network from the transmitter to the at least one receiver.

According to an embodiment, the transmitter is operable periodically to reprobe the maximum supported segment size of the entire communication route, and to adjust dynamically the size of the data packets pursuant to the reprobed maximum supported segment size of the entire communication route.

According to an embodiment, the mutually different priorities are implemented in a priority order substantially as defined by:

| Prioritization code | Information type |
|---|---|
| Higher priority | Reserved 0 |
| | Control command |
| | Broadcast message |
| | Audio data |
| | Video data |
| | Reserved 5 |
| | Text data |
| | File data |
| Lower priority | Playback data |

According to an embodiment, the transmitter is operable to employ a maximum delay before sending a given data packet, and is operable to pad the given data packet to a maximum segment size if insufficient data has been provided for the mutually different types of data when the maximum delay is reached.

According to an embodiment, the transmitter is operable to generate the data packets, wherein at least a portion of the data packets is encrypted for subsequent decryption at the at least one receiver.

Optionally, the transmitter can be implemented as a user device. Examples of such user devices include, but are not limited to, mobile phones, smart telephones, MID's, tablet computers, UMPC's, phablet computers, PDA's, web pads, PC's, handheld PC's, laptop computers, desktop computers, and large-sized touch screens with embedded PC's.

In a third aspect, embodiments of the present disclosure provide a receiver for use in a data communication system, characterized in that the receiver is operable to process at least one data packet received via a data communication network and/or a data carrier from at least one transmitter, wherein the at least one data packet includes a plurality of mutually different types of data having mutually different priorities, and the receiver is operable to process the mutually different types of data to mutually separate the mutually different types of data.

By "mutually different types of data" is meant data of mutually different content, structure, format, for example encoding format, temporal characteristics (for example a video sequence or an audio sample), multi-dimensional data (for example relating to 3-dimensional biological scanning images) and so forth.

By "mutually different priorities" is meant an order in which given data to be processed is selected to be correspondingly processed in a data communication system.

Optionally, the mutually different types of data are separated out in the receiver to corresponding channels, for example, such as meta data, audio data, video data, parameter data.

Optionally, the receiver is operable to receive information that is indicative of the mutually different priorities of the plurality of mutually different types of data, and to process the plurality of mutually different types of data according to the information that is indicative of the mutually different priorities of the plurality of mutually different types of data.

Optionally, the receiver is operable to process the information that is indicative of the mutually different priorities of the plurality of mutually different types of data, wherein the information is included within the at least one data packet.

According to an embodiment, the receiver is operable to unpack the at least one data packet to extract data chunks of the mutually different types of data from the at least one data packet, and to construct data streams of the mutually different types of data from the data chunks as per an order in which the data chunks occur in the at least one data packet. Optionally, the at least one receiver is then operable to process the data streams further after the data streams have been constructed from the data chunks.

Optionally, the receiver is operable to unpack the data packets in an order in which the data packets arrive at the receiver. Alternatively, optionally, if the data packets are numbered, the receiver is operable to unpack the data packets in an order as designated by their associated numbers.

Optionally, the receiver is implemented without using a codec. In such a case, different encoders and other data sources deliver their data to their respective delivery queues separately and asynchronously.

Alternatively, optionally, the receiver is integrated with a given codec, or at least synchronized with the given codec. In such a case, the receiver has knowledge of, namely possesses information that is indicative of, when a next chunk is arriving. Such synchronized knowledge is advantageously utilized to improve, for example to optimize, construction of data packets and to reduce, for example to minimize, any delays in transmission of time-critical data.

According to an embodiment, the receiver is operable to decrypt at least a portion of the at least one data packet when the at least a portion of the at least one data packet is encrypted.

According to an embodiment, the receiver is operable to send, to the at least one transmitter, configuration data for use in constructing the at least one data packet.

Optionally, the receiver can be implemented as a user device. Examples of such user devices include, but are not limited to, mobile phones, smart telephones, MID's, tablet computers, UMPC's, phablet computers, PDA's, web pads, PC's, handheld PC's, laptop computers, desktop computers, and large-sized touch screens with embedded PC's.

In a fourth aspect, embodiments of the present disclosure provide a method of communicating data, the method comprising communicating data packets via a data communication network and/or a data carrier from at least one transmitter to at least one receiver, characterized in that the method further comprises including within at least one of the data packets a plurality of mutually different types of data having mutually different priorities.

By "mutually different types of data" is meant data of mutually different content, structure, format, for example encoding format, temporal characteristics (for example a video sequence or an audio sample), multi-dimensional data (for example relating to 3-dimensional biological scanning images) and so forth.

By "mutually different priorities" is meant an order in which given data to be communicated is selected to be processed and thereafter communicated in a data communication system.

Optionally the method further includes communicating to the at least one receiver information that is indicative of the mutually different priorities of the plurality of mutually different types of data.

Optionally, the method includes incorporating the information that is indicative of the mutually different priorities of the plurality of mutually different types of data within the at least one data packet.

According to an embodiment, the method further comprises including the information to be indicative of at least one of: life-times of the different types of data, permissible latencies of the different types of data, formats of the different types of data, time-to-live expectations of the different types of data, required response times for the different types of data.

Optionally, the method further comprises generating the at least one of the data packets by employing a multistage process that includes:
(i) providing data to at least one data stream;
(ii) compressing the at least one data stream; and
(iii) assembling the at least one data stream to generate the data packets for communicating from the at least one transmitter to the at least one receiver.

According to an embodiment, the method further comprises constructing the data packets as determined by configuration data received from the at least one receiver and/or the data communication network.

According to an embodiment, the method further comprises assembling the data packets until their size approaches substantially a maximum segment size of the data communication network before sending the data packets to the at least one receiver.

According to an embodiment, the method further comprises adjusting a size of the data packets to a maximum supported segment size of an entire communication route through the data communication network from the at least one transmitter to the at least one receiver.

According to an embodiment, the method further comprises periodically reprobing the maximum supported segment size of the entire communication route, and adjusting dynamically the size of the data packets pursuant to the reprobed maximum supported segment size of the entire communication route.

According to an embodiment, the data communication network communicates the data packets without splitting the data packets into fragments.

According to an embodiment, the data communication network is implemented, at least in part, as a peer-to-peer network.

According to an embodiment, the method further comprises implementing the mutually different priorities in a priority order substantially as defined by:

| Prioritization code | Information type |
| --- | --- |
| Higher priority | Reserved 0 |
| | Control command |
| | Broadcast message |
| | Audio data |
| | Video data |
| | Reserved 5 |
| | Text data |
| | File data |
| Lower priority | Playback data |

According to an embodiment, the method further comprises generating the data packets at the at least one transmitter, wherein at least a portion of the data packets is encrypted, and decrypting the at least a portion of the data packets at the at least one receiver when the data packets are received at the at least one receiver.

According to an embodiment, the method further comprises employing a maximum delay before sending a given data packet, and padding the given data packet to a maximum segment size if insufficient data has been provided for the mutually different types of data when the maximum delay is reached.

In a fifth aspect, embodiments of the present disclosure provide a method of operating a transmitter, the method comprising communicating data packets via a data communication network and/or a data carrier to at least one receiver, characterized in that the method further comprises including within at least one of the data packets a plurality of mutually different types of data having mutually different priorities.

By "mutually different types of data" is meant data of mutually different content, structure, format, for example encoding format, temporal characteristics (for example a video sequence or an audio sample), multi-dimensional data (for example relating to 3-dimensional biological scanning images) and so forth.

By "mutually different priorities" is meant an order in which given data to be communicated is selected to be processed and thereafter communicated in a data communication system.

Optionally, the method further includes communicating to the at least one receiver information that is indicative of the mutually different priorities of the plurality of mutually different types of data.

Optionally, the method further includes incorporating the information that is indicative of the mutually different priorities of the plurality of mutually different types of data within the at least one data packet.

According to an embodiment, the method further comprises including the information to be indicative of at least one of: life-times of the different types of data, permissible latencies of the different types of data, formats of the different types of data, time-to-live expectations of the different types of data, required response times for the different types of data.

Optionally, the method further comprises generating the at least one of the data packets by employing a multistage process that includes:
(i) providing data to at least one data stream;
(ii) compressing the at least one data stream; and
(iii) assembling the at least one data stream to generate the data packets for communicating from the transmitter to the at least one receiver.

According to an embodiment, the method further comprises constructing the data packets as determined by configuration data received from the at least one receiver and/or the data communication network.

According to an embodiment, the method further comprises assembling the data packets until their size approaches substantially a maximum segment size of the data communication network before sending the data packets to the at least one receiver.

According to an embodiment, the method further comprises adjusting a size of the data packets to a maximum supported segment size of an entire communication route through the data communication network from the transmitter to the at least one receiver.

According to an embodiment, the method further comprises periodically reprobing the maximum supported segment size of the entire communication route; and adjusting dynamically the size of the data packets pursuant to the reprobed maximum supported segment size of the entire communication route.

According to an embodiment, the method further comprises implementing the mutually different priorities in a priority order substantially as defined by:

| Prioritization code | Information type |
| --- | --- |
| Higher priority | Reserved 0 |
| | Control command |
| | Broadcast messacle |
| | Audio data |
| | Video data |
| | Reserved 5 |
| | Text data |
| | File data |
| Lower priority | Playback data |

According to an embodiment, the method further comprises employing a maximum delay before sending a given data packet; and padding the given data packet to a maximum segment size if insufficient data has been provided for the mutually different types of data when the maximum delay is reached.

According to an embodiment, the method further comprises generating the data packets, wherein at least a portion of the data packets is encrypted for subsequent decryption at the at least one receiver.

In a sixth aspect, embodiments of the present disclosure provide a method of operating a receiver, characterized in that the method comprises:

processing at least one data packet received via a data communication network and/or a data carrier from at least one transmitter, wherein the at least one data packet includes a plurality of mutually different types of data having mutually different priorities; and processing the mutually different types of data to mutually separate the mutually different types of data included in the at least one data packet.

By "mutually different types of data" is meant data of mutually different content, structure, format, for example encoding format, temporal characteristics (for example a video sequence or an audio sample), multi-dimensional data (for example relating to 3-dimensional biological scanning images) and so forth.

By "mutually different priorities" is meant an order in which given data to be processed is selected to be correspondingly processed in a data communication system.

Optionally, the method includes receiving at the receiver information that is indicative of the mutually different priorities of the plurality of mutually different types of data; and processing the mutually different types of data according to the information that is indicative of the mutually different priorities of the plurality of mutually different types of data.

Optionally, in the method, the information that is indicative of the mutually different priorities of the plurality of mutually different types of data is included within the at least one data packet.

According to an embodiment, the method further comprises unpacking the at least one data packet to extract data chunks of the mutually different types of data from the at least one data packet, and constructing data streams of the mutually different types of data from the data chunks as per an order in which the data chunks occur in the at least one data packet.

According to an embodiment, the method further comprises decrypting at least a portion of the at least one data packet when the at least a portion of the at least one data packet is encrypted.

According to an embodiment, the method further comprises sending, to the at least one transmitter, configuration data for use in constructing the at least one data packet.

Moreover, optionally, the method is advantageously used alone. However, sometimes it is beneficial to use the method with a data communication system and method as described in reference [10]. In such cases, associated acknowledgements of received and processed data packets are delivered from a given receiver to a given transmitter, for example, as described earlier. This potentially enables the given transmitter to minimize delays in transmission while still using its previously known amount of buffers.

As an example, a given encoder at the given transmitter first encodes data as long as its buffers have been filled. Once the buffers are filled, the given encoder does not start a new batch of processing, for example, for video frames before at least one acknowledgement of a properly received and processed video frame has been received from a given decoder at the given receiver. This potentially enables the given transmitter to allocate a previously known amount of buffers, for example, for processing video frames. As a result, the video frames are processed only when they are required to be processed, while using a known amount of buffers.

In a seventh aspect, embodiments of the present disclosure provide a computer program product comprising a non-transitory computer-readable storage medium having computer-readable instructions stored thereon, the computer-readable instructions being executable by a computerized device comprising processing hardware to execute any of the aforementioned methods.

Next, embodiments of the present disclosure will be described with reference to figures.

Figure 2:
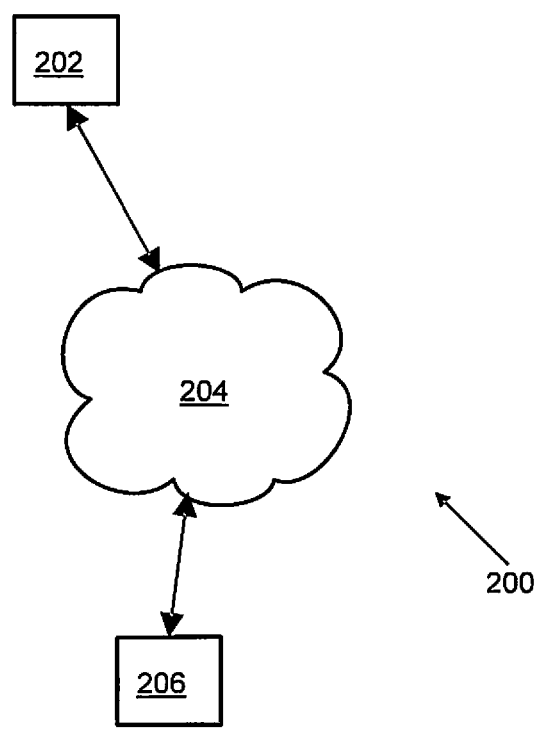
FIG. 2 is a schematic illustration of a data communication system, in accordance with an embodiment of the present disclosure.

Referring to FIG. 2, there is shown a schematic illustration of a data communication system 200, in accordance with an embodiment of the present disclosure. The data communication system 200 includes at least one transmitter, depicted as a transmitter 202 in FIG. 2.

The transmitter 202 communicates data packets via a data communication network 204 to at least one receiver, depicted as a receiver 206 in FIG. 2.

FIG. 2 is merely an example, which should not unduly limit the scope of the present disclosure. It is to be understood that the illustration of the data communication system 200 is provided as an example and is not limited to a specific number and/or arrangement of transmitters, receivers, and data communication networks. A person skilled in the art will recognize many variations, alternatives, and modifications of embodiments of the present disclosure. In an alternative implementation, the transmitter 202 communicates data packets via a data carrier to at least one receiver.

Figure 3A:
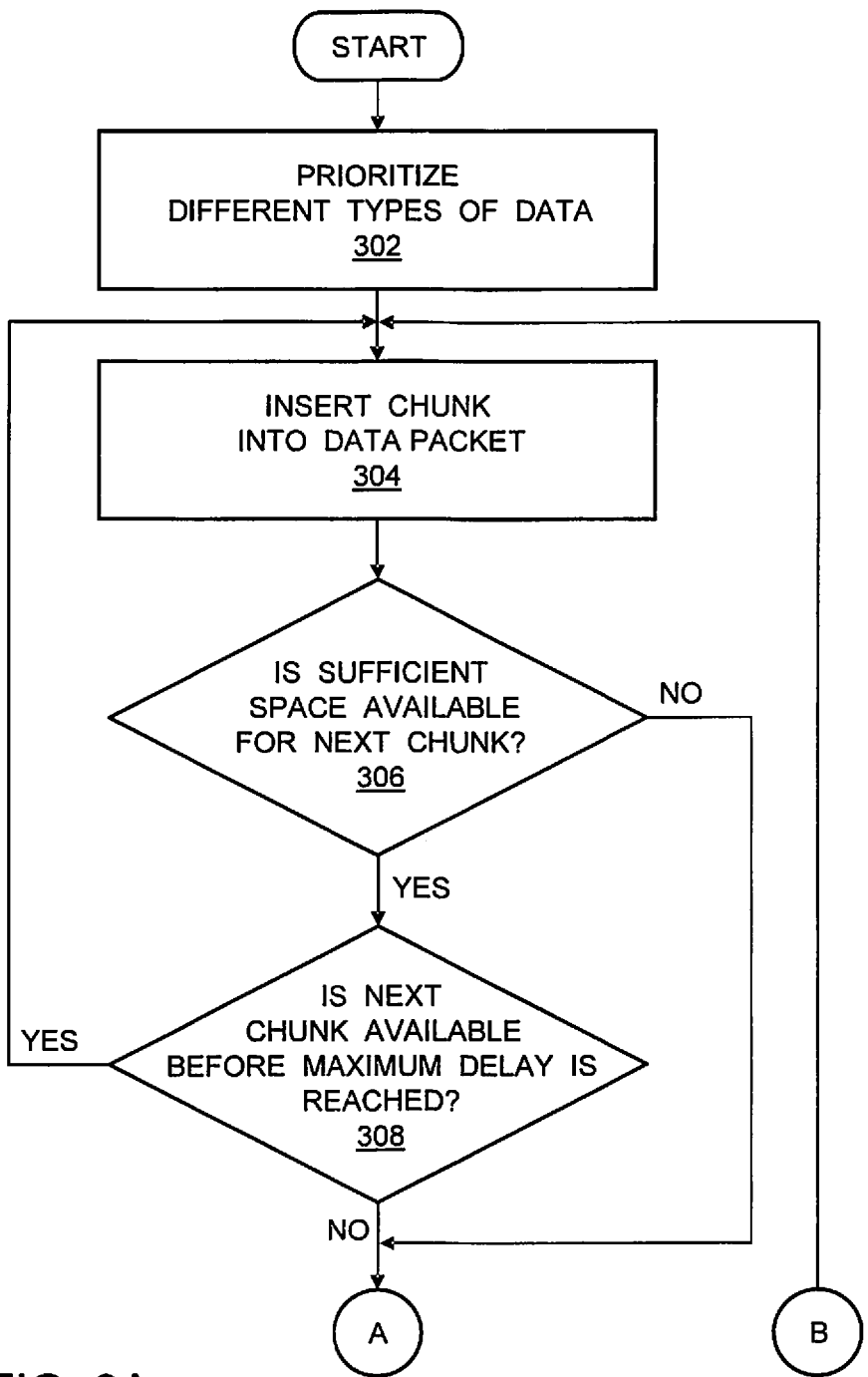
FIGS. 3A and 3B collectively are a schematic illustration of a flow chart depicting steps of a method of communicating data, in accordance with an embodiment of the present disclosure.
Figure 3B:
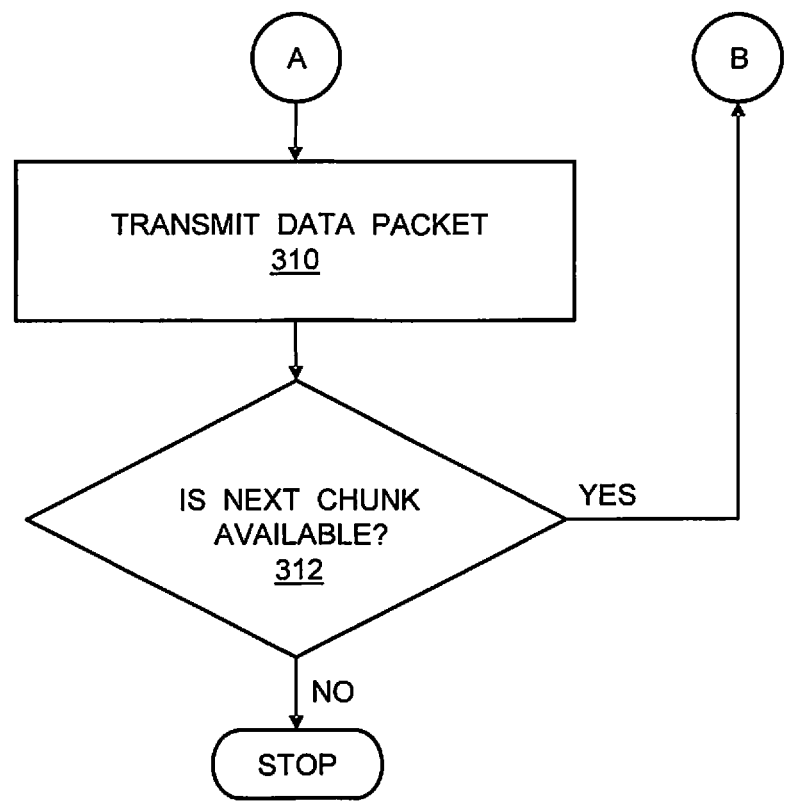

Referring now to FIGS. 3A and 3B, there is provided a flow chart depicting steps of a method of communicating data, in accordance with an embodiment of the present disclosure. The method is depicted as a collection of steps in a logical flow diagram, which represents a sequence of steps that can be implemented in hardware, software, or a combination thereof, for example as aforementioned.

The method is implemented via at least one transmitter of a data communication system.

At a step 302, mutually different types of data that are available to be written or transmitted are prioritized.

Optionally, in accordance with the step 302, chunks of the different types of data are queued in a priority queue in a manner that chunks of a given type of data of a highest priority from amongst the different types of data are prioritized over other chunks.

At a step 304, a chunk of the given type of data of the highest priority is inserted into a data packet.

Next, at a step 306, it is checked whether or not a sufficient space is available in the data packet for a next chunk. If, at the step 306, it is found that a sufficient space is available in the data packet, a step 308 is performed.

At the step 308, it is checked whether or not a next chunk is available to be inserted before a maximum delay is reached.

If, at the step 308, it is found that a next chunk is available to be inserted before the maximum delay is reached, the step 304 is performed. Correspondingly, the next chunk is inserted into the same data packet. Otherwise, if it is found that the next chunk is not available before the maximum delay is reached, a step 310 is performed.

If, at the step 306, it is found that a sufficient space is not available in the data packet, the step 310 is performed.

At the step 310, the data packet is transmitted to at least one receiver. Optionally, in accordance with the step 310, the data packet is padded to a maximum supported segment size of an entire communication route through a given data communication network from the at least one transmitter to the at least one receiver, when required.

Next, at a step 312, it is checked whether or not any chunk is available to be written or transmitted. If, at the step 312, it is found that a next chunk is available, the step 304 is performed. Correspondingly, the next chunk is inserted into a next data packet. Otherwise, if it is found that no chunk is available, the processing stops.

The steps 302 to 312 are only illustrative and other alternatives can also be provided where one or more steps are added, one or more steps are removed, or one or more steps are provided in a different sequence without departing from the scope of the claims herein.

It will be appreciated that the aforementioned processing waits for new chunks only when no chunk is queued for transmission and there is enough time to be spent waiting. However, in most practical situations, data packets are constructed so fast that the maximum delay may not be required to be taken into consideration.

Figure 4:
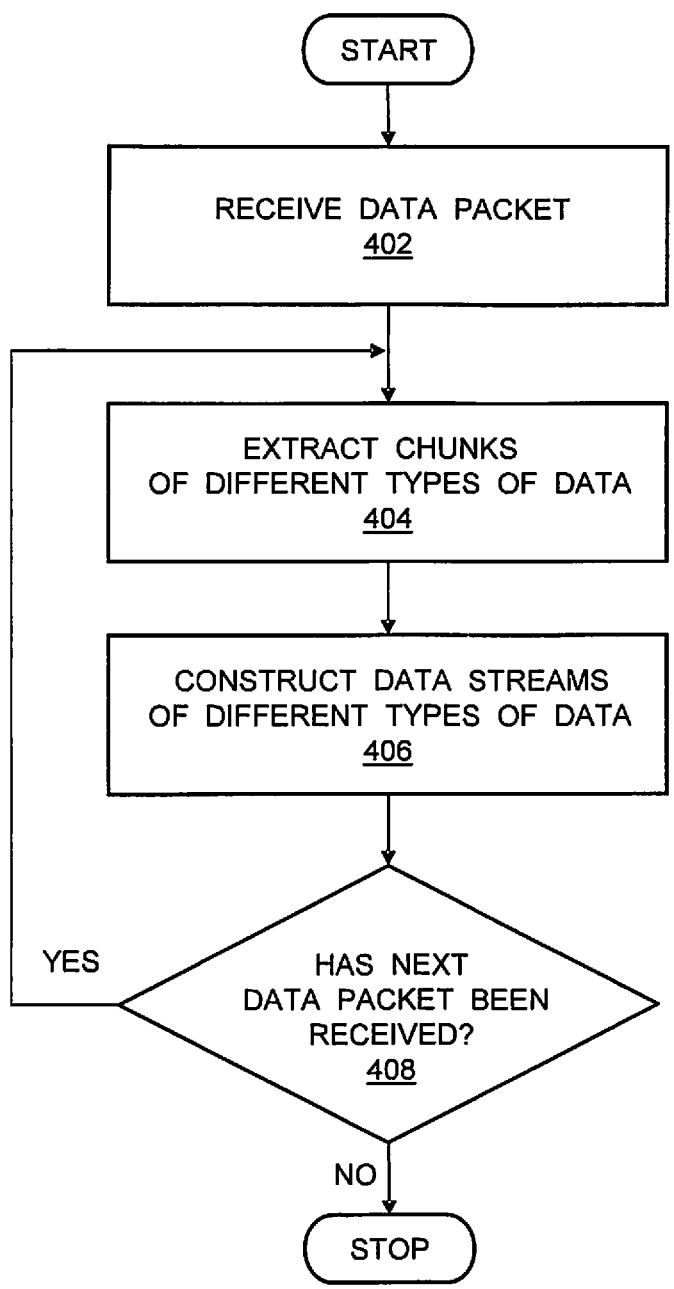
FIG. 4 is a schematic illustration of a flow chart depicting steps of a method of processing data packets, in accordance with an embodiment of the present disclosure.

Referring now to FIG. 4, there is provided a flow chart depicting steps of a method of processing data packets, in accordance with an embodiment of the present disclosure. The method is depicted as a collection of steps in a logical flow diagram, which represents a sequence of steps that can be implemented in hardware, software, or a combination thereof, for example as aforementioned.

The method is implemented via at least one receiver of a data communication system that receives the data packets from at least one transmitter.

At a step 402, a data packet is received, wherein the data packet includes a plurality of mutually different types of data having mutually different priorities, optionally together with information that is indicative of the mutually different priorities of the plurality of mutually different types of data. Optionally, the information is provided independently of the data packet. Optionally, the information is not provided, and a default structure for the data packet is employed, wherein the default structure is defined a priori, namely before the data packet is sent from at least one transmitter to at least one receiver involved.

At a step 404, chunks of the mutually different types of data are extracted from the data packet.

Subsequently, at a step 406, data streams of the mutually different types of data are constructed from the chunks extracted at the step 404.

Next, at a step 408, it is checked whether or not a next data packet has been received at the at least one receiver. If, at the step 408, it is found that a next data packet has been received, the steps 404 and 406 are performed. Correspondingly, data chunks are extracted from the next data packet, and processed further to construct the data streams.

If, at the step 408, it is found that a next data packet has not been received, the processing either stops or waits to receive a next data packet until a given connection between the at least one transmitter and the at least one receiver is open.

The steps 402 to 408 are only illustrative and other alternatives can also be provided where one or more steps are added, one or more steps are removed, or one or more steps are provided in a different sequence without departing from the scope of the claims herein. Optionally, the method includes an additional step at which the data streams constructed at the step 406 are processed further, for example, to play audio data and to display video data at the at least one receiver.

Figure 5A:
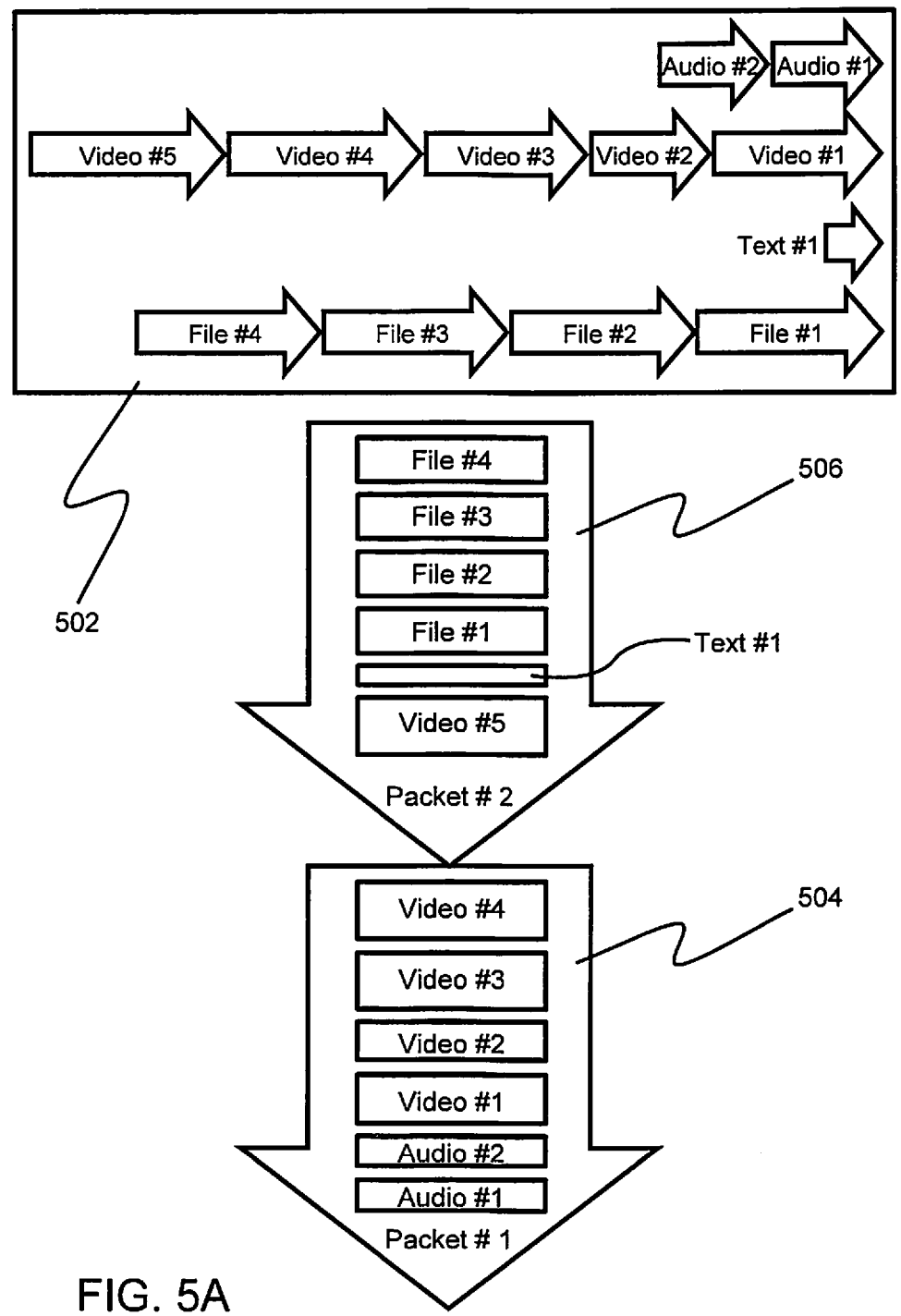
FIGS. 5A, 5B and C collectively are a schematic illustration of an example of constructing data packets, in accordance with an embodiment of the present disclosure.
Figure 5B:
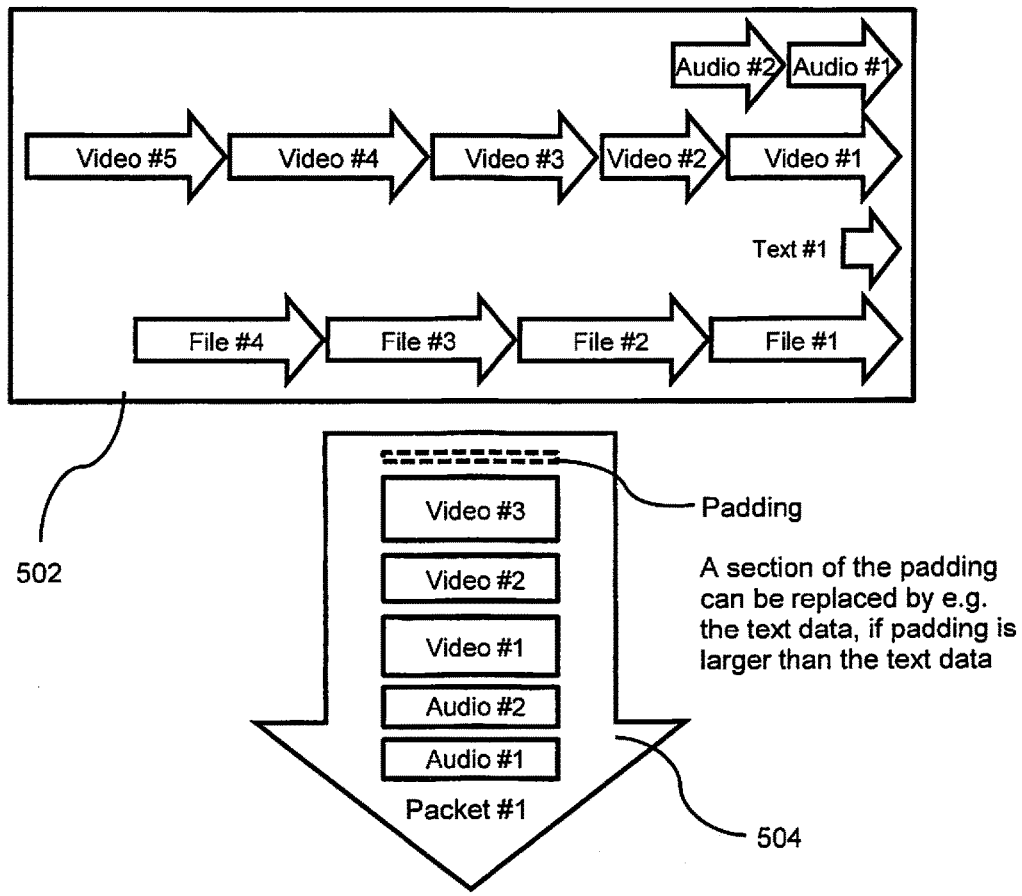
Figure 5C:
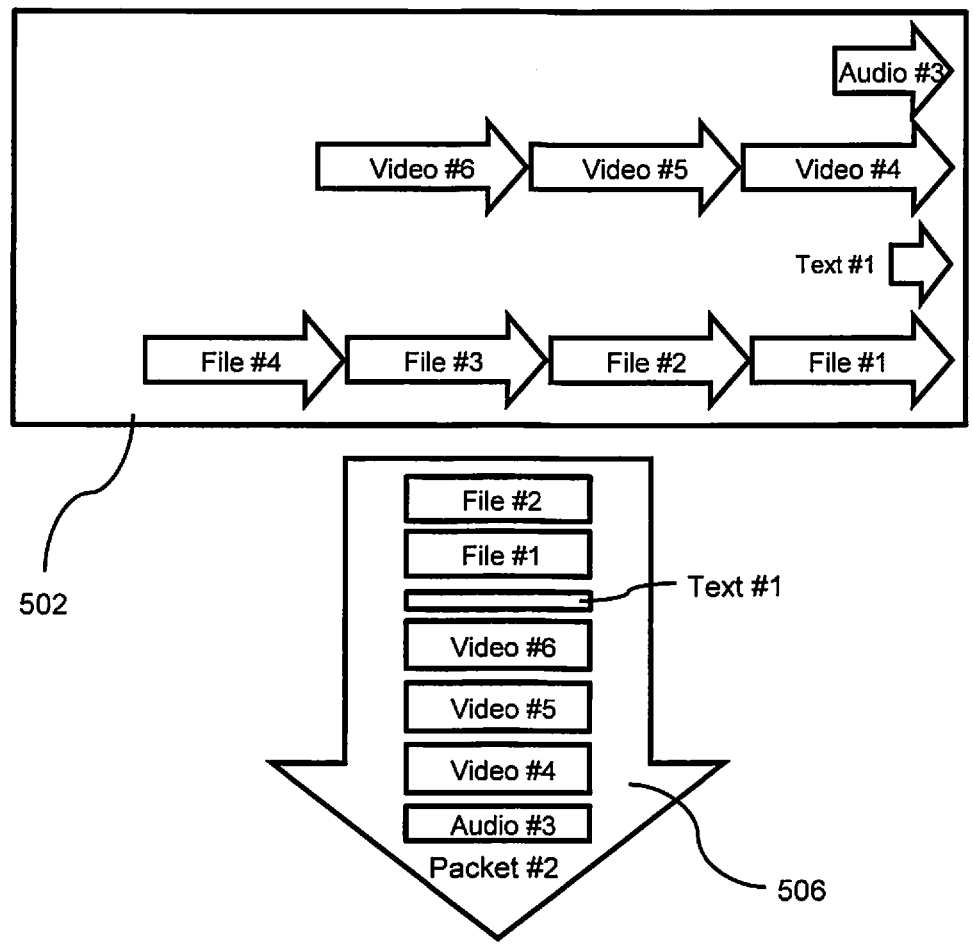

Referring next to FIGS. 5A, 5B and 5C, there is shown a schematic illustration of an example of constructing data packets, in accordance with an embodiment of the present disclosure.

In the example illustrated in FIGS. 5A-C, a descending order of priorities of mutually different types of data is as follows: audio data, video data, text data, and file data.

In FIGS. 5A-C, there is shown a priority sending queue 502 of the different types of data, namely a queue where the different types of data are queued to be sent in a prioritized manner. The priority sending queue 502 includes chunks of the different types of data, namely two audio chunks, five video chunks, one text chunk and four file chunks shown in FIG. 5A.

In the illustrated example, it will be appreciated that:
(i) each of the two audio chunks has a size of 160 bytes;
(ii) a first video chunk has a size of 240 bytes, a second video chunk has a size of 180 bytes, a third video chunk has a size of 235 bytes, and each of a fourth and a fifth video chunk has a size of 285 bytes;
(iii) the text chunk has a size of 80 bytes; and
(iv) each of the four file chunks has a size of 270 bytes.

A given transmitter extracts from the priority sending queue 502 chunks of the different types of data to construct data packets that are optimized to a maximum supported segment size of an entire communication route through a data communication network from the given transmitter to a given receiver.

In the illustrated example, it will be appreciated that the maximum supported segment size is 1460 bytes. As a result, a first data packet 504 includes the two audio chunks and first four video chunks, and is padded to the maximum supported segment size. Correspondingly, remaining chunks, namely the fifth video chunk, the text chunk and the four file chunks, are assembled into a second data packet 506, which is also padded to the maximum supported segment size. In this manner, the first data packet 504 and the second data packet 506 carry a maximal amount of data as regards their payload, and have a size of 1460 bytes each. In this regard, a size of header is also taken into account when the maximum supported segment size is used to enable optimally-sized packets to be delivered between the given transmitter and the given receiver.

FIG. 5A is merely an example, which should not unduly limit the scope of the present disclosure. A person skilled in the art will recognize many variations, alternatives, and modifications of embodiments of the present disclosure. In FIG. 5A, there is provided an illustration of how two data packets are constructed from an initial example sequence of data that has two audio chunks, five video chunks, one text chunk and four file chunks. On account of the priority of the audio data being the highest, both of the two audio chunks will go into the first data packet 504, after which there is still room for four chunks that have the next highest priority, namely four chunks of the video data.

After this, the construction of the second data packet 506 can proceed. The second data packet 506 will contain the remaining chunks of the initial example sequence of data in the priority order, namely the video chunk first, followed by the text chunk and finally the four file chunks.

Next, in FIGS. 5B and 5C, there is provided an illustration of how data packets are constructed, for example in real time: in FIG. 5B, there in provided an illustration of the packet construction and sending of the first data packet 504 at a point in time T1, while, in FIG. 5C, there is provided an illustration of the packet construction and sending of the second data packet 506 at another point in time T2 (wherein T2>T1), namely when the first data packet 504 has been sent further. The initial example sequence of data in FIG. 5B is the same as that in FIG. 5A. However, in FIG. 5B, there is provided an illustration of a situation where there is no room for the fourth video chunk in the first data packet 504, for example when the maximum supported segment size is reduced to be in sync with a change in the data transfer capacity of the data communication network. In such a case, the first data packet 504 is optionally padded with padding bytes, so that the optimal packet size is reached. A section of the padding in the first data packet 504 is optionally replaced by the text data, namely the text chunk, if the padding is larger than the text chunk. Beneficially, a chunk that has the highest possible priority is selected to fill up the remaining space in the first data packet 504 before padding, if such a chunk can be found.

It will be appreciated that relative sizes of the chunks of the different types of data have been illustrated schematically in FIGS. 5A-C to visualize a fact that an optimized packet payload can contain data chunks of different sizes, and the sizes of the data chunks need not be the same for a same type of data.

In order to illustrate a real-time scenario, there will next be considered a situation wherein one new audio chunk and one new video chunk have arrived between the points in time T1 and T2, and are added to the priority sending queue 502 to wait for delivery.

Therefore, the first chunk to be added into the second data packet 506 in FIG. 5C will be the newly-arrived audio chunk, and the insertion of the video chunks will continue after the newly-arrived audio chunk has been inserted. With reference to FIG. 5C, all the remaining video chunks and the newly-arrived video chunk fit into the second data packet 506, and there is still room for the text chunk and for the first two file chunks. The insertion of the chunks will then continue in such a manner that each new data packet to be sent will be filled with such chunks that are currently waiting for delivery and that have the highest priority from amongst the waiting chunks.

As stated earlier, time-critical chunks have a certain time-to-live limit, which has to be taken into account during the process of filling the data packets with chunks. Namely, if the time-to-live limit is imminent, then the current data packet will have to be filled, for example with padding bytes, and sent further immediately. Sometimes, because of the time-to-live limit, video chunks can sometimes be dropped from the priority queue 502 and never sent, if their data would already be outdated and/or if their synchronization with the remaining audio chunks would no longer be possible. In such a situation, it is more advantageous to drop those video chunks and to send newer video chunks that are synchronous with the remaining audio chunks.

Figure 6A:
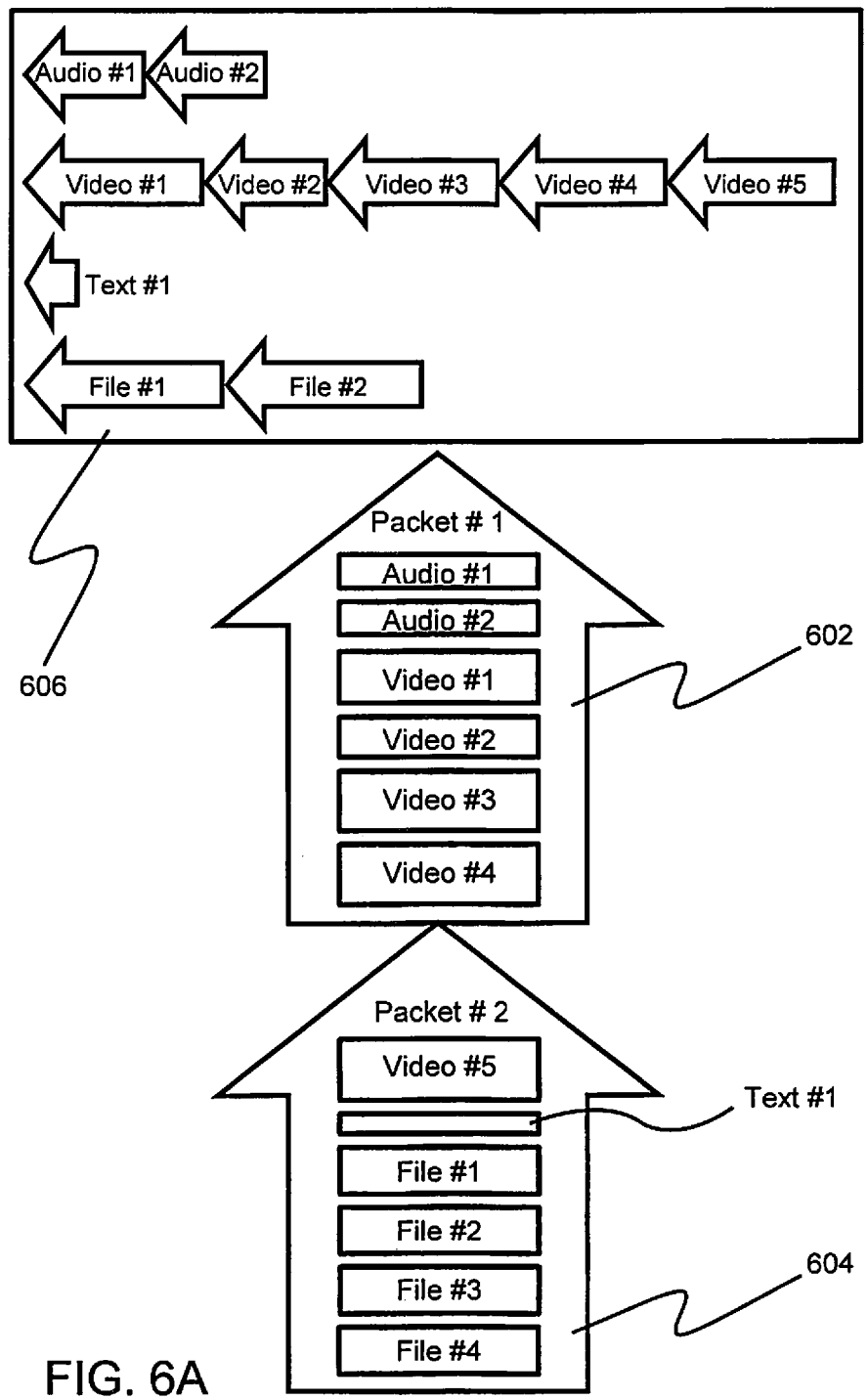
FIGS. 6A, 6B and 6C collectively are a schematic illustration of an example of unpacking data packets, in accordance with an embodiment of the present disclosure.
Figure 6B:
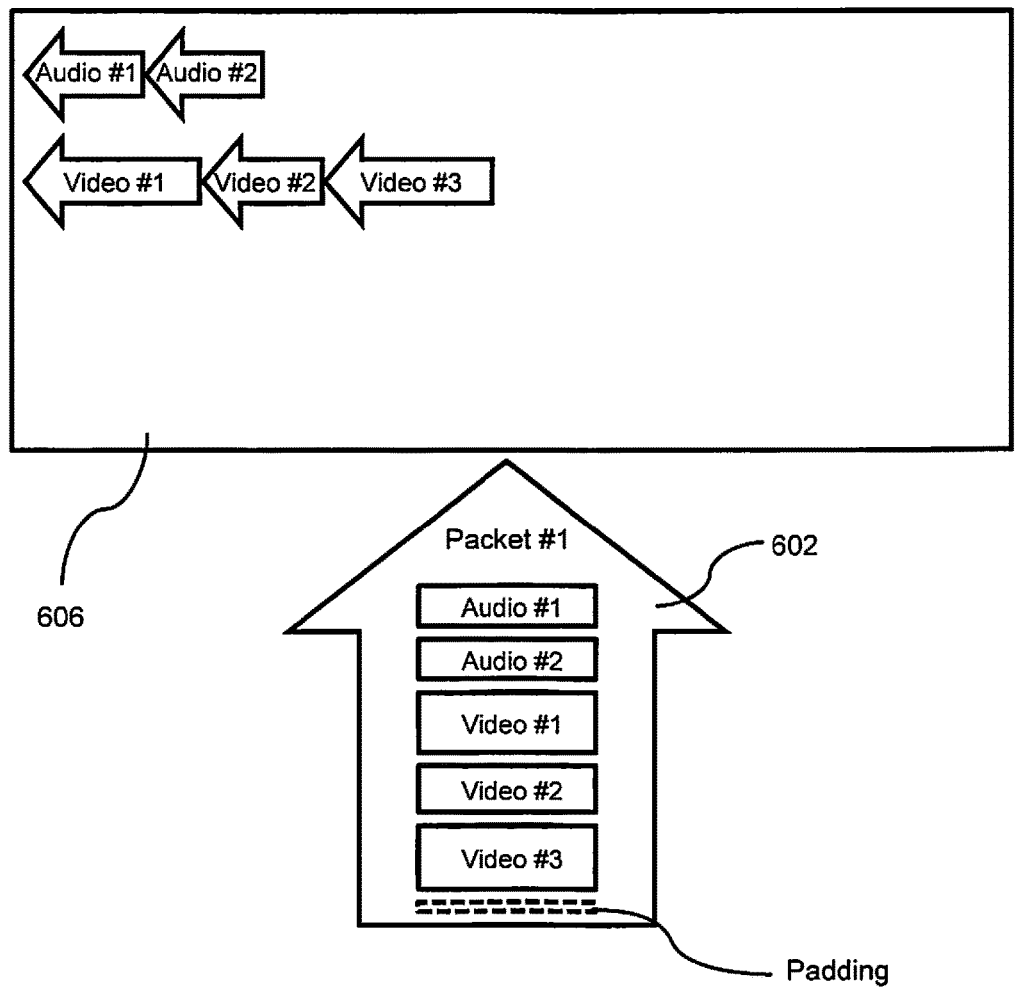
Figure 6C:
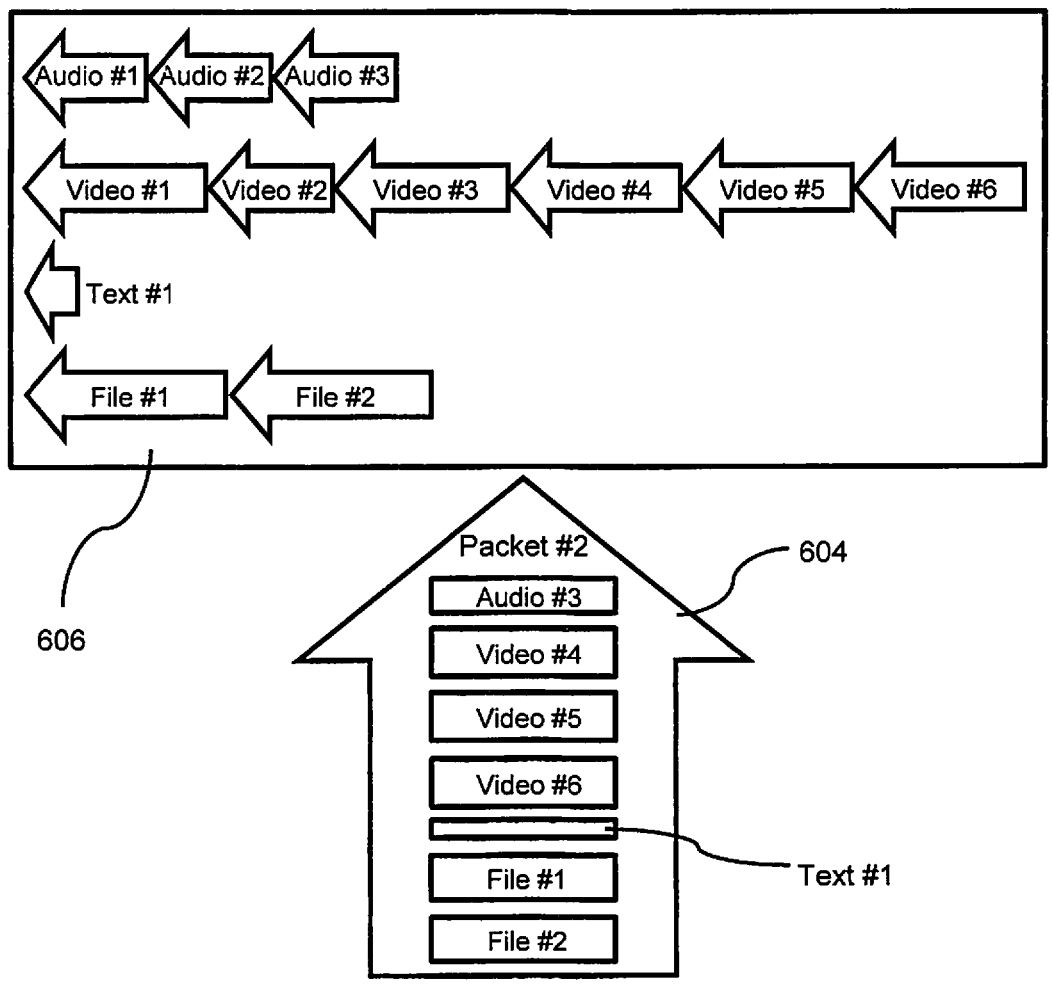

Referring now to FIGS. 6A, 6B and 6C, there is shown a schematic illustration of an example of unpacking data packets, in accordance with an embodiment of the present disclosure.

In the illustrated example, a given receiver receives two data packets, depicted as a first data packet 602 and a second data packet 604. The first data packet 602 includes two audio chunks and four video chunks, while the second data packet 604 includes one video chunk, one text chunk and four file chunks.

The data packets 602 and 604 are unpacked to extract the data chunks. The extracted chunks are then processed to construct data streams 606 of mutually different types of data, namely an audio data stream, a video data stream, a text data stream and a file data stream, as shown in FIGS. 6A-C.

In FIGS. 6B-C, there is provided an illustration of how data packets are unpacked, for example in real time, namely in a manner that the reception of the data packets 602 and 604 and the unpacking of the data packets 602 and 604 into the data streams 606 is shown for each data packet separately. In other words, the unpacking of each data packet occurs at that point in time when that data packet is received by the given receiver.

It will be appreciated that the data packets 602 and 604 in FIGS. 6B-C correspond to the data packets 504 and 506 in FIGS. 5B-C, respectively, for illustration purposes only.

FIGS. 6A-C are merely an example, which should not unduly limit the scope of the present disclosure. A person skilled in the art will recognize many variations, alternatives, and modifications of embodiments of the present disclosure.

Figure 7A:
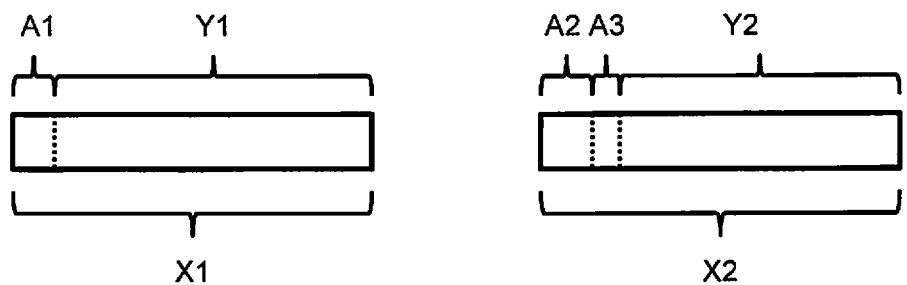
FIGS. 7A and 7B collectively are a schematic illustration of an example of an internal division and a structure of a payload of data packets, in accordance with an embodiment of the present disclosure.
Figure 7B:
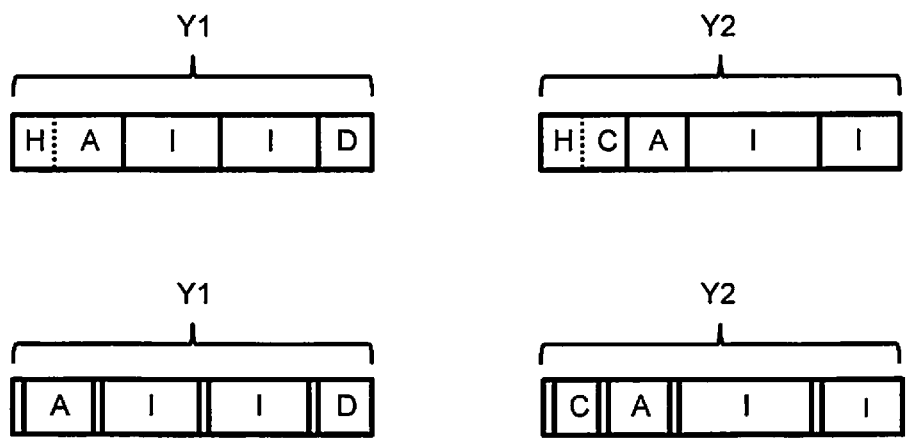

Furthermore, it will be appreciated that the data packets are constructed in such a manner that the entire size of the data packets is optimized. For example, if a data packet to be sent needs longer protocol headers or additional protocol headers, the payload size of the data packet is reduced accordingly. In this regard, FIGS. 7A and 7B provide an illustration of an example of how the size of the payload is adjusted if the size of the protocol headers changes. This might occur, for example, when some of the data packets are sent via different channels, using different network protocols and standards, and/or to different receivers.

Referring now to FIG. 7A, there are shown two data packets, whose entire packet sizes are indicated by 'X1' and 'X2'. The data packet on a left side has one header, denoted by 'A1', which leaves a section 'Y1' for the payload therein, whereas the data packet on a right side has two headers, denoted by 'A2' and 'A3', which leave a section 'Y2' for the payload therein. Therefore, the data packet on the left side has more room for the payload, as compared to the data packet on the right side.

In FIG. 7B, there is illustrated how the payload sections 'Y1' and 'Y2' are divided internally.

With reference to an upper part of FIG. 7B, the payload section 'Y1' has a header section, denoted by 'H', which is an internal header that is not a part of any public standard or network protocol. This internal header specifies properties of data chunks that follow it, and its size is included in the size of the payload. After the internal header 'H', four data chunks, denoted by 'A', 'I', 'I' and 'D', follow; 'A' indicates an audio chunk, 'I' indicates an image chunk and 'D' indicates a general data chunk. On the other hand, the payload section 'Y2' has an internal header, denoted by 'H', a control data chunk, denoted by 'C', an audio chunk, denoted by 'A' and two image chunks, denoted by 'I' and 'I'.

The composition of the payload sections 'Y1' and 'Y2' as depicted in the upper part of FIG. 7B is not the only way in which the internal headers and the data chunks can be inserted into the payload sections 'Y1' and 'Y2'. In a lower part of FIG. 7B, there is provided an illustration of a situation where each individual data chunk has its own small header specifying the properties of that data chunk, in which case a single large common internal header at the beginning of the packet payload is not required.

Optionally, when a transmitter of a data communication system pursuant to the present disclosure is operable to construct data packets for sending to a corresponding receiver, the transmitter performs a following sequence of data additions from steps S(1) to S(x) to form a given data packet, wherein x is an integer greater than unity:

| Operation | Detail | Prioritization code |
| --- | --- | --- |
| S1 | add control commands | 1 |
| S2 | add video data | 8 |
| S3 | add audio data | 4 |
| S4 | add video data | 8 |
| S5 | add audio data | 4 |
| ... | ... | ... |
| S(x) | assemble packet | |

It will be appreciated that other numbers of steps are optionally employed.

The mutually different types of data in the steps S(2) to S(5) are added in an interleaved manner. The prioritization codes are either included in the given data packet, or are communicated independently of the data packet to the receiver.

HTTP chunked data transfer is beneficially employed for communicating the given data packet. Moreover, data compression is optionally applied either during add operations performed in the steps S(2) to S(5), or during assembly in the step S(x). Optionally, data compression is applied both during adding in the steps S(2) to S(5), and also during the assembly in the step S(x).

At the corresponding receiver, the given data packet is unpacked, by using the control commands, and different streams of data type are then reconstructed from portions of the given data packet by using the control commands.

Embodiments of the present disclosure are susceptible to being used for various purposes, including, though not limited to, enabling processing of prioritized data into data packets that are optimized to a maximum supported segment size of an entire communication route, so that time-critical data is duly delivered to a given receiver before the data is outdated or before a time-to-live period defined for the data ends.

Pursuant to aforementioned embodiments of the present disclosure, when one or more given data packets including a plurality of mutually different types of data are communicated from at least one transmitter to at least one receiver, the one or more given data packets form at least one data stream. Optionally, the at least one data stream is generated as follows in following computational phases:
(a) initial data is first added into the at least one data stream, wherein the initial data includes, for example, one or more of: control commands, audio data, video data and so forth; and
(b) the at least one data stream is assembled into one or more data packets to be communicated from the at least one transmitter to the at least one receiver.

Optionally, there are a plurality of data streams that are utilized in such communication. Optionally, a plurality of data streams are employed for generating the one or more data packets.

Compression of the data can take place in either of the computational phases, even if beneficially it is executed already when the data is added to the streams, thereby avoiding a delay when a given data packet is filled for encoding the entire given data packet. Optionally, sometimes the data becomes outdated during the filling of the data packets, and there is provided a computational arrangement for removing such outdated data from the at least one data stream. Optionally, such removal is performed before data compression occurs for the one or more data packets.

Optionally, in an example embodiment of the present disclosure, data packets are generated pursuant to a three-stage process, wherein the process includes:
(i) providing data to at least one data stream;
(ii) compressing the at least one data stream; and
(iii) assembling the at least one data stream to generate one or more data packets to be communicated from at least one given transmitter to at least one given receiver.

Other processes to generate the data packets, for example as described in the foregoing are optionally employed for embodiments of the present disclosure.

Modifications to embodiments of the invention described in the foregoing are possible without departing from the scope of the invention as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

REFERENCES

| Reference index | Detail |
|---|---|
| [1] | Real Time Messaging Protocol—Wikipedia, the free encyclopedia (accessed Feb. 11, 2015), URL: http://en.wikipedia.org/wiki/Real_Time_Messaging_Protocol |
| [2] | Adobe's Real Time Messaging Protocol (accessed Feb. 11, 2015), URL: http://www.adobe.com/content/dam/Adobe/en/devnet/rtmp/pdf/rtmp_specification_1.0.pdf |
| [3] | Quality of service—Wikipedia, the free encyclopedia (accessed Feb. 11, 2015), URL: http://en.wikipedia.org/wiki/Quality_of_service |
| [4] | Nagle's algorithm—Wikipedia, the free encyclopedia (accessed Feb. 11, 2015), URL: http://en.wikipedia.org/wiki/Nagle%27s_algorithm |
| [5] | General Packet Radio Service—Wikipedia, the free encyclopedia (accessed Feb. 11, 2015), URL: http://en.wikipedia.org/wiki/General_Packet_Radio_Service |
| [6] | Wireless LAN—Wikipedia, the free encyclopedia (accessed Feb. 11, 2015), URL: http://en.wikipedia.org/wiki/Wireless_LAN |
| [7] | Maximum transmission unit—Wikipedia, the free encyclopedia (accessed Feb. 11, 2015), URL: http://en.wikipedia.org/wiki/Maximum_transmission_unit |
| [8] | Path MTU Discovery—Wikipedia, the free encyclopedia (accessed Feb. 11, 2015), URL: http://en.wikipedia.org/wiki/Path_MTU_Discovery |
| [9] | Two-way Real-time Communication System Utilizing HTTP (accessed Feb. 11, 2015.) URL: http://gurulogic.com/files/WO2014173521A1.pdf |
| [10] | Data Communication System and Method (accessed Feb. 11, 2015), URL: http://gurulogic.com/files/US2014317173A1.pdf |

We claim:

1. A data communication system comprising:
at least one transmitter that is configured to communicate data packets via a data communication network and/or a data carrier to at least one receiver,
wherein the at least one transmitter is configured to select from a plurality of mutually different types of data having mutually different priorities, wherein the mutually different priorities include a highest priority and a plurality of lower priorities lower than the highest priority, and
wherein the at least one transmitter is configured to include a plurality of data types having mutually different priorities within at least one of the data packets by iteratively selecting from among the plurality of mutually different types of data, wherein each iteration includes selecting a data type having a priority that is highest among priorities of data types available to be selected in such iteration, wherein in at least one iteration the selected data type has a priority included in the plurality of lower priorities.

2. The data communication system of claim 1, wherein the data communication system is operable to communicate to the at least one receiver information that is indicative of an assignment of the mutually different priorities with the plurality of mutually different types of data.

3. The data communication system of claim 2, wherein the data communication system is operable to communicate the information that is indicative of the assignment of the one or more priorities with the plurality of mutually different types of data within the at least one of the data packets.

4. The data communication system of claim 2, wherein the at least one transmitter is operable to include information indicative of at least one of: life-times of the different types of data, permissible latencies of the different types of data, formats of the different types of data, time-to-live expectations of the different types of data, or required response times for the different types of data.

5. The data communication system of claim 1, wherein the data communication system is operable to generate the at least one of the data packets by employing a multistage process that includes:

(i) Providing data to at least one data stream;
(ii) Compressing the at least one data stream; and
(iii) Assembling the at least one data stream to generate the data packets for communicating from the at least one transmitter to the at least one receiver.

6. The data communication system of claim 1, wherein the at least one transmitter is operable to construct the data packets as determined by configuration data received from the at least one receiver and/or the data communication network.

7. The data communication system of claim 1, wherein the at least one transmitter is operable to assemble the data packets until their size approaches substantially a maximum segment size of the data communication network before sending the data packets to the at least one receiver.

8. The data communication system of claim 7, wherein the data communication system is operable to adjust a size of the data packets to a maximum supported segment size of an entire communication route through the data communication network from the at least one transmitter to the at least one receiver.

9. The data communication system of claim 8, wherein the data communication system is operable periodically to reprobe the maximum supported segment size of the entire communication route, and to adjust dynamically the size of the data packets pursuant to the reprobed maximum supported segment size of the entire communication route.

10. The data communication system of claim 1, wherein the data communication network communicates the data packets without splitting the data packets into fragments.

11. The data communication system of claim 1, wherein the data communication network is implemented, at least in part, as a peer-to-peer network.

12. The data communication system of claim 2, wherein the mutually different priorities are implemented in a priority order as defined by:

| Prioritization code | Information type |
| --- | --- |
| Higher priority | Reserved 0 |
|  | Control command |
|  | Broadcast message |
|  | Audio data |
|  | Video data |
|  | Reserved 5 |
|  | Text data |
|  | File data |
| Lower priority | Playback data |

13. The data communication system of claim 1, wherein the at least one transmitter is operable to employ a maximum delay before sending a given data packet, and is operable to pad the given data packet to a maximum segment size if insufficient data has been provided for the mutually different types of data when the maximum delay is reached.

14. The data communication system of claim 1, wherein the at least one transmitter is operable to generate the data packets, wherein at least a portion of the data packets is encrypted, and the at least one receiver is operable to decrypt the at least a portion of the data packets when the data packets are received at the at least one receiver.

15. A transmitter for use in a data communication system, the transmitter comprising:
one or more processors; and
at least one memory coupled to the one or more processors, the at least one memory having instructions stored thereon which, when executed by the one or more processors, cause the transmitter to:
communicate data packets via a data communication network and/or a data carrier to at least one receiver,
select from a plurality of mutually different types of data having mutually different priorities, wherein the mutually different priorities include a highest priority and a plurality of lower priorities lower than the highest priority, and
include a plurality of data types having mutually different priorities within at least one of the data packets by iteratively selecting from among the plurality of mutually different types of data, wherein each iteration includes selecting a data type having a priority that is highest among priorities of data types available to be selected in such iteration, wherein in at least one iteration the selected data type has a priority included in the plurality of lower priorities.

16. The transmitter of claim 15, wherein the at least one memory has instructions stored thereon which when executed by the one or more processors further cause the transmitter to communicate to the at least one receiver information that is indicative of an assignment of the mutually different priorities with the plurality of mutually different types of data.

17. The transmitter of claim 16, wherein the mutually different priorities are implemented in a priority order as defined by:

| Prioritization code | Information type |
| --- | --- |
| Higher priority | Reserved 0 |
|  | Control command |
|  | Broadcast message |
|  | Audio data |
|  | Video data |
|  | Reserved 5 |
|  | Text data |
|  | File data |
| Lower priority | Playback data |

18. A receiver for use in a data communication system, the receiver comprising:
one or more processors; and
at least one memory coupled to the one or more processors, the at least one memory having instructions stored thereon which, when executed by the one or more processors, cause the receiver to:
process at least one data packet received via a data communication network and/or a data carrier from at least one transmitter configured to include a plurality of data types having mutually different priorities within the at least one data packet by iteratively selecting data types, wherein the at least one data packet includes a plurality of mutually different types of data having mutually different priorities, wherein the mutually different priorities include a highest priority and a plurality of lower priorities lower than the highest priority; and
process the mutually different types of data to mutually separate the mutually different types of data, wherein each iteration of the iteratively selecting includes selecting a data type having a priority that is highest among priorities of data types available to be selected by the at least one transmitter in the iteration, wherein in at least one iteration the selected data type has a priority included in the plurality of lower priorities.

19. The receiver of claim 18, wherein the at least one memory has instructions stored thereon which when executed by the one or more processors further cause the receiver to receive information that is indicative of an assignment of the mutually different priorities with the plurality of mutually different types of data, and to process the mutually different types of data according to the information that is indicative of the assignment of the mutually different priorities with the plurality of mutually different types of data.

20. A method of communicating data, the method comprising:

communicating data packets via a data communication network and/or a data carrier from at least one transmitter to at least one receiver;

selecting from a plurality of mutually different types of data having mutually different priorities, wherein the mutually different priorities include a highest priority and a plurality of lower priorities lower than the highest priority; and including a plurality of data types having mutually different priorities within at least one of the data packets by iteratively selecting from among the included plurality of mutually different types of data, wherein each iteration includes selecting a data type having a priority that is highest among priorities of data types available to be selected in such iteration, wherein in at least one iteration the selected data type has a priority included in the plurality of lower priorities.

21. The method of claim 20, wherein the method further comprises communicating to the at least one receiver information that is indicative of an assignment of the mutually different priorities with the plurality of mutually different types of data.

22. The method of claim 21, wherein the method further comprises incorporating the information that is indicative of the assignment of the mutually different priorities with the plurality of mutually different types of data within the at least one data packet.

23. The method of claim 21, wherein the method further comprises including information indicative of at least one of: life-times of the different types of data, permissible latencies of the different types of data, formats of the different types of data, time-to-live expectations of the different types of data, or required response times for the different types of data.

24. The method of claim 20, wherein the method further comprises generating the at least one of the data packets by employing a multistage process that includes:

(i) providing data to at least one data stream;
(ii) compressing the at least one data stream; and
(iii) assembling the at least one data stream to generate the data packets for communicating from the at least one transmitter to the at least one receiver.

25. The method of claim 20, wherein the method further comprises constructing the data packets as determined by configuration data received from the at least one receiver and/or the data communication network.

26. The method of claim 20, wherein the method further comprises assembling the data packets until their size approaches substantially a maximum segment size of the data communication network before sending the data packets to the at least one receiver.

27. The method of claim 26, wherein the method further comprises adjusting a size of the data packets to a maximum supported segment size of an entire communication route through the data communication network from the at least one transmitter to the at least one receiver.

28. The method of claim 27, wherein the method further comprises periodically reprobing the maximum supported segment size of the entire communication route; and adjusting dynamically the size of the data packets pursuant to the reprobed maximum supported segment size of the entire communication route.

29. The method of claim 20, wherein the data communication network communicates the data packets without splitting the data packets into fragments.

30. The method of claim 20, wherein the data communication network is implemented, at least in part, as a peer-to-peer network.

31. The method of claim 21, wherein the method further comprises implementing the mutually different priorities in a priority order as defined by:

| Prioritization code | Information type |
| --- | --- |
| Higher priority | Reserved 0 |
|  | Control command |
|  | Broadcast message |
|  | Audio data |
|  | Video data |
|  | Reserved 5 |
|  | Text data |
|  | File data |
| Lower priority | Playback data |

32. The method of claim 20, wherein the method further comprises employing a maximum delay before sending a given data packet; and padding the given data packet to a maximum segment size if insufficient data has been provided for the mutually different types of data when the maximum delay is reached.

33. The method of claim 20, wherein the method further comprises generating the data packets at the at least one transmitter, wherein at least a portion of the data packets is encrypted; and decrypting the at least a portion of the data packets at the at least one receiver when the data packets are received at the at least one receiver.

34. A method of operating a receiver, wherein the method comprises:

processing at least one data packet received via a data communication network and/or a data carrier from at least one transmitter configured to include a plurality of data types having mutually different priorities within the at least one data packet by iteratively selecting data types, wherein the at least one data packet includes a plurality of mutually different types of data having mutually different priorities, wherein the mutually different priorities include a highest priority and a plurality of lower priorities lower than the highest priority; and processing the mutually different types of data to mutually separate the plurality of mutually different types of data, wherein each iteration of the iteratively selecting includes selecting a data type having a priority that is highest among priorities of data types available to be selected by the at least one transmitter in the iteration, wherein in at least one iteration the selected data type has a priority included in the plurality of lower priorities.

35. The method of claim 34, wherein the method further comprises receiving at the receiver information that is indicative of an assignment of the mutually different priorities with the plurality of mutually different types of data; and processing the mutually different types of data according to the information that is indicative of the assignment of the one or more priorities with the plurality of mutually different types of data.

36. A computer program product comprising a non-transitory computer-readable storage medium having computer-readable instructions stored thereon, the computer-readable instructions being executable by a computerized device comprising processing hardware wherein when the computer-readable instructions are executed by the computerized device, the computerized device performs a method comprising:

communicating data packets via a data communication network and/or a data carrier from at least one transmitter to at least one receiver;

selecting from a plurality of mutually different types of data having mutually different priorities, wherein the mutually different priorities include a highest priority and a plurality of lower priorities lower than the highest priority; and including a plurality of data types having mutually different priorities within at least one of the data packets by iteratively selecting from among the plurality of mutually different types of data, wherein each iteration includes selecting a data type having a priority that is highest among priorities of data types available to be selected in such iteration, wherein in at least one iteration the selected data type has a priority included in the plurality of lower priorities.

37. A computer program product comprising a non-transitory computer-readable storage medium having computer-readable instructions stored thereon, the computer-readable instructions being executable by a computerized device comprising processing hardware wherein when the computer-readable instructions are executed by the computerized device, the computerized device performs a method comprising:

processing at least one data packet received via a data communication network and/or a data carrier from at least one transmitter configured to include a plurality of data types having mutually different priorities within the at least one data packet by iteratively selecting data types, wherein the at least one data packet includes a plurality of mutually different types of data having mutually different priorities, wherein the mutually different priorities include a highest priority and a plurality of lower priorities lower than the highest priority; and processing the mutually different types of data to mutually separate the plurality of mutually different types of data, wherein each iteration of the iteratively selecting includes selecting a data type having a priority that is highest among priorities of data types available to be selected by the at least one transmitter in the iteration, wherein in at least one iteration the selected data type has a priority included in the plurality of lower priorities.

* * * * *